US006489610B1

(12) United States Patent
Barofsky et al.

(10) Patent No.: US 6,489,610 B1
(45) Date of Patent: Dec. 3, 2002

(54) TANDEM TIME-OF-FLIGHT MASS SPECTROMETER

(75) Inventors: Douglas F. Barofsky, Corvallis, OR (US); Per Håkansson, Uppsala (SE); Daniel Louis Katz, McMinnville, OR (US); C. K. Gamini Piyadasa, Kandana (LK)

(73) Assignee: The State of Oregon acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 09/405,208

(22) Filed: Sep. 24, 1999

Related U.S. Application Data

(60) Provisional application No. 60/101,852, filed on Sep. 25, 1998.

(51) Int. Cl.[7] .......................... B01D 59/44; H01J 49/00

(52) U.S. Cl. ...................................... 250/287; 250/282

(58) Field of Search ................................ 250/281, 282, 250/287

(56) References Cited

U.S. PATENT DOCUMENTS 5,032,722 A * 7/1991 Boesl et al. ................ 250/287
5,073,713 A * 12/1991 Smith et al. ................ 250/282
5,160,840 A 11/1992 Vestal ........................ 250/287
5,464,985 A 11/1995 Cotter ........................ 250/287
5,614,711 A * 3/1997 Li et al. ..................... 250/287
5,654,545 A 8/1997 Holle et al. ................. 250/287
5,696,375 A 12/1997 Park et al. .................. 250/287
5,753,909 A 5/1998 Park et al. .................. 250/287
5,821,534 A 10/1998 Park ........................... 250/287
5,905,259 A 5/1999 Franzen ....................... 250/287
5,986,258 A 11/1999 Park ........................... 250/287
6,080,985 A * 6/2000 Welkie et al. .............. 250/287

* cited by examiner

*Primary Examiner*—Bruce Anderson
(74) *Attorney, Agent, or Firm*—Klarquist Sparkman, LLP

(57) ABSTRACT

A tandem time-of-flight mass spectrometer includes an ion source, a velocity selector downstream of the ion source, a dissociation cell downstream of the velocity selector, and an ion accelerator downstream of the dissociation cell, the accelerator being capable of focusing ions at a space focal plane, and an ion-reflector (reflectron) downstream of the accelerator. The accelerator allows the ions to subsequently separate according to their m/z ratios and the reflectron to subsequently space-focus the ions over a broad mass range at a detector. A velocity selector includes a pair of ion defectors each having multiple electrically conductive strips, the strips including alternate positive voltage strips and alternate negative voltage strips. A method of selecting a subset of ions from a set of ions includes applying a voltage across a first ion deflector so as to deflect ions passing through the first deflector in a first direction away from a flight path, switching off the voltage applied to the first ion deflector in phase with the passage of a subset of ions having a select range of velocities so that the subset of ions is deflected less in the first direction than preceding ions, switching on a voltage applied to a second ion deflector downstream of the first ion deflector so as to deflect ions passing through the second ion deflector in a second direction and to deflect the subset of ions back along the flight path, and maintaining a voltage across the second gate so as to deflect ions following the subset of ions away from the flight path. The velocity selector also can be used in a single-deflector mode.

89 Claims, 7 Drawing Sheets

230

232
+Vgate
234
0
624
620
m-Δm
634
m+Δm
m
622
-Vgate
0
t=tt
230

232
234
+V'<Vgate
0
636
624
620
622
630
m+Δm
m
m- Δm
t=t'
-V'
0
634
230

232
234
0
-V''
638
620
m
m+Δm
624
632
634
622
m- Δm
t=t''
0
+V'' =Vgate

TANDEM TIME-OF-FLIGHT MASS SPECTROMETER

CROSS REFERENCE TO RELATED APPLICATION

The present application claims priority from copending United States provisional application No. 60/101,852, which was filed on Sep. 25, 1998. Provisional application No. 60/101,852 is incorporated herein by reference.

FIELD

The invention concerns mass spectrometers, and more specifically tandem time-of-flight mass spectrometers.

BACKGROUND

Mass spectrometry comprises a broad range of instruments and methodologies that are used to elucidate the structural and chemical properties of molecules, to identify the compounds present in physical and biological matter, and to quantify the chemical substances found in samples of such matter. Mass spectrometers can detect minute quantities of pure substances (regularly, as little as $10^{-12}$ g) and, as a consequence, can identify compounds at very low concentrations (one part in $10^{-12}$ g) in chemically complex mixtures. Mass spectrometry is a powerful analytical science that is a necessary adjunct to research in every division of natural and biological science and provides valuable information to a wide range of technologically based professions, such as medicine, law enforcement, process control engineering, chemical manufacturing, pharmacy, biotechnology, food processing and testing, and environmental engineering. In these applications, mass spectrometry is used to identify structures of biomolecules, such as carbohydrates, nucleic acids and steroids; sequence biopolymers, such as proteins and oligosaccharides; determine how drugs are used by the body; perform forensic analyses, such as confirmation and quantiation of drugs of abuse; analyze environmental pollutants; determine the age and origins of geochemical and archaeological specimens; identify and quantitate components of complex organic mixtures; and perform ultrasensitive, multi-element analyses of inorganic materials, such as metal alloys and semiconductors.

Mass spectrometers measure the masses of individual molecules that have been converted to gas-phase ions, i.e., to electrically charged molecules in a gaseous state. The principal parts of a typical mass spectrometer are the ion source, mass analyzer, detector, and data handling system. Solid, liquid, or vapor samples are introduced into the ion source where ionization and volatilization occur. The form of the sample and the size and structure of the molecules determine which physical and chemical processes must be used in the ion source to convert the sample into gas-phase ions. To effect ionization, it is necessary to transfer some form of energy to the sample molecules. In most instances, this causes some of the nascent molecular ions to disintegrate (either somewhere in the ion source or just after they exit the ion source) into a variety of fragment ions. Both surviving molecular ions and fragment ions formed in the ion source are passed on to the mass analyzer, which uses electromagnetic forces to sort them according to their mass-to-charge ratios (m/z), or a related mechanical property, such as velocity, momentum, or energy. After they are separated by the analyzer, the ions are successively directed to the detector. The detector generates electrical signals, the magnitudes of which are proportional to the number of ions striking the detector per unit time. The data system records these electrical signals and displays them on a monitor or prints them out in the form of a mass spectrum, i.e., a graph of signal intensity versus m/z. In principle, the pattern of molecular-ion and fragment-ion signals that appear in the mass spectrum of a pure compound constitutes a unique chemical fingerprint from which the compound's molecular mass and, sometimes, its structure can be deduced.

Tandem Mass Spectrometers

The utility of a mass spectrometric analysis can be significantly enhanced by performing two (or more) stages of mass analysis in tandem. A two-stage instrument is referred to herein as an MS/MS instrument. An MS/MS instrument performs two (or more) independent mass analyses in sequence. In the most frequently used mode of MS/MS, ions of a particular m/z value are selected in the first stage of mass analysis ($MS^1$) from among all the ions of various masses formed in the source. The selected ions (referred to as precursor ions) are energized, usually by collision with a neutral gas molecule, to induce dissociation. The product ions of these dissociations are sorted into a product-ion mass spectrum in the second stage of mass analysis ($MS^2$). If the sample is a pure compound and fragment-forming ionization has been used, individual fragment ions originating in the ion source can be selected as precursor ions; their product-ion spectra (which may be thought of as mass spectra within a mass spectrum) provide much additional structural information about the compound. If the sample is a mixture and nonfragment-forming ionization is used to produce predominantly molecular ions, the second stage of mass analysis can provide an identifying mass spectrum for each component in the mixture.

Independent operation of each stage of mass analysis makes possible other MS/MS operations based on changes in mass, charge, or reactivity and on the ability of the mass spectrometer to define those changes. MS/MS also can be used to substantially improve signal-to-background ratios and, therefore, sensitivity by eliminating interferences in certain types of operations when the ion signal at the m/z of interest is produced by more than one compound. Increasingly, MS/MS is being used to probe more precisely into problems of ion structure as well as to increase resolution in analyses of complex mixtures.

Time-of-Flight Mass Spectrometers

At present, the most widely used mass analyzers are magnetic sectors, quadrupole mass filters, quadrupole ion traps, Fourier-transform ion-cyclotron resonance cells, and time-of-flight (TOF) tubes. TOF mass analyzers are fundamentally the simplest and the least expensive to manufacture. They separate ions by virtue of their different flight times over a known distance. To create these different times, an ensemble of ions of like charge are accelerated to essentially equal kinetic energies and, in a brief burst, released from the ion source into the flight tube. Since an ion's kinetic energy is equal to $\frac{1}{2}mv^2$ (where m is its mass and v its velocity) and all ions of like charge have substantially the same energy, light ions will have greater velocities and, consequently, shorter flight times to the detector than heavy ions. The m/z values of each set of ions contained in a given burst out of the ion source can be determined by measuring their successive transit times from the ion source through the flight tube to the detector (typically several tens of microseconds).

A TOF mass spectrometer is unique in that its m/z-range is theoretically unlimited, and its mass spectra are not produced by scanning. Moreover, it is a relatively simple, inexpensive instrument to manufacture and operate. These three features account in large part for the major role TOF instruments have played in the rapidly expanding usage of mass spectrometry in molecular-biological research and biotechnology.

With the other four commonly used mass analyzers, the settings of one or more parameters determines the m/z of the ions that are allowed to pass to the detector. In order for ions with a different m/z to be detected, these settings must be increased or decreased. Ultimately, some fundamental or practical characteristic of the mass analyzer limits the extent to which its m/z-determining parameters can be changed to accommodate analysis of increasingly larger ions. In a TOF mass analyzer, increasingly larger ions simply take increasingly longer times to reach the detector, and there is no limit to the length of time that can be measured. Thus, TOF mass analyzers are especially useful for the analysis of large biological molecules.

Scanning denotes a continuous increasing or decreasing of a mass analyzer's m/z-determining parameters over a predetermined range so that ions over a corresponding range of m/z-values can be detected in succession. The analytical efficiency of a mass spectrometric analysis is greatly reduced by scanning because, while the ions of one particular m/z are being detected, the ions of all other m/z-values released from the ion source are being irretrievably lost in the instrument. With TOF mass analyzers, by contrast, all of the ions released in an ion-burst from the source are detected and recorded without changing any instrumental parameters. Consequently, TOF mass spectrometers are particularly sensitive instruments.

TOF mass spectrometers may be constructed using relatively simple components, such as accelerators, ion reflectors, and ion detectors. Moreover, TOF mass spectrometers are relatively simple to operate because they are stable in operation and the components require minimal tuning. Because of their relatively simple construction and operation, TOF mass spectrometers are relatively inexpensive to construct and operate.

Referring to FIG. 1, a typical time-of-flight mass spectrometer includes an ion source, a drift region, and a detector. Ion sources have two components: an ionization chamber and an ion extractor/accelerator. A sample is received in the ionization chamber, volatilized if necessary, and ionized (usually by some is energetic process). An ionization process that is particularly suited for large biological molecules is matrix-assisted laser desorption/ionization (MALDI). MALDI requires that the sample be dispersed within a matrix of solid, crystalline material. A laser is focused on the sample to volatilize and ionize the sample. The process also may cause a portion of the resulting ions to dissociate into smaller fragment ions. Those of ordinary skill in the art are familiar with the construction and operation of MALDI sources.

Focusing Ions

In general, ions formed in a TOF ion source have different times of formation, initial positions and velocities. Without some form of correction, these variations in the ions' initial mechanical properties diminish the resolution of the mass-dependant bands that are later detected. The uncertainties associated with these variations can be corrected one at a time, but it is very difficult with a single device to correct for two or more of them simultaneously. Wiley and McLaren developed a two-stage ion source that, with certain restrictions, can force ions having the same mass-to-charge but different initial positions or velocities to arrive nearly simultaneously at a particular plane some distance downstream of the ion source. [Wiley, W. C.; McLaren, I. H.; *Review of Scientific Instruments*, Vol. 26:12, pp. 1150–1157 (1955), which is incorporated herein by reference]. The position of this plane, which is referred to as the space focal plane, is uniquely defined by the ion source's geometry, and the voltage applied to the ion source's electrodes. [Potter, R. J.; "Time-of-Flight Mass Spectrometry," American Chemical Society, Washington, D.C., (1997), which is incorporated herein by reference.] In a Wiley/McLaren two-stage source, the ionization chamber (or ionization region) is separated from the accelerating region by a plane grid. The electric field in the ionization region (or first stage) is made smaller than in the accelerating region electric field by adjusting the voltages applied to the sources backing plate and to the grid separating the two regions. Ions move from the ionization region, into the acceleration region, and out of the source under the influence of these electric fields. Ions can be generated in the ionization chamber or injected into it. After a short time delay the electric field in the ionization region is switched on. This electric field moves the ions out of the first stage into the second stage where they are accelerated to greater velocities.

By means of time-lag focusing, the two-stage ion source is able to correct for variation in the initial velocities of the ions providing they are formed in, or nearly in, a plane that is parallel to the backing plate and the dividing grid. During the lag period $\tau$, the ions spread out in the ionization chamber in accordance with their velocities at the time of their formation. Those ions that are closer to the backing plate when the electric field is switched on (lagging ions) are accelerated over a longer distance before entering the second stage than ions farther from the backing plate (leading ions). Thus, the lagging ions receive more kinetic energy from the first electric field than the leading ions. Consequently, the lagging ions eventually catch up with leading ions of the same m/z. At the plane where the lagging ions catch the leading ions of the same m/z, the ions are said to be energy-focused. The time lag energy focal plane of an ion source coincides with that ion source's space focal plane. The distance from the exit of the accelerating region to the plane where space focusing occurs is referred to as the space-focal length f. Under a fixed set of conditions, f is mass dependent so ions of different masses will have different focal lengths. In a given mass spectrometer, the distance from the exit of the accelerating region to any ion-optical component downstream of the ion source, e.g., velocity selector, post velocity selection accelerator, ion reflector, or ion detector, is fixed by the instrument's geometry. The focal length for ions of any particular mass can always be made equal to any of these fixed distances by adjusting the ratio $E_a/E_e$ of the electric fields in the accelerating region ($E_a$) and the extraction region ($E_e$) and, in the case of time-lag-focusing, the delay or lag time $\tau$. Because the dimensions of these regions are fixed for a given ion source, $E_a/E_e$ is varied by changing the voltages applied to the repeller plate and the extractor/accelerator grid that separates the two regions.

Tandem Time-of-Flight Mass Spectrometers

TOF mass spectrometry's steadily growing range of application in biomolecular analysis has prompted several attempts to develop tandem TOF instruments. Two approaches have been taken: 1) coupling two independently usable mass spectrometers together; and 2) using velocity selection as the basis for the first stage of mass spectrometry in the tandem sequence of operations. The first is classical and general to all forms of mass spectrometry. The second is recent and specific to time-of-flight mass spectrometers. The classical approach to constructing a tandem TOF mass spectrometer has so far produced three instrument forms: 1) a high-resolution TOF mass analyzer coupled to a high resolution TOF mass analyzer (TOF/TOF); 2) a double-focusing sector mass analyzer coupled to a high resolution TOF mass analyzer (Sector/TOF); and 3) a quadrupole mass filter coupled to a high- resolution TOF mass analyzer (Q/TOF). These instruments produce mass spectra that exhibit unit mass-resolution Q/TOF) or better (TOF/TOF and Sector/TOF) in the first stage of mass analysis ($MS^1$). In the cases of TOF/TOF and Sector/TOF, the gain in $MS^1$-resolution is offset by low sensitivity because, in instances where PSD is the predominant fragmentation process, very few precursors reach the collision cell and the second stage of mass analysis ($MS^2$) or, in instances where the collision cell must be used to induce fragmentation, the collisional dissociation process interferes with the timing and transmissions of the $MS^2$-TOF. Either way, the performance and, hence, utility of these tandem instruments are degraded.

Q/TOF instruments are manufactured by two companies: Micromass Ltd., Floats Road, Wythenshawe, Manchester M23 9LZ, UK; and PE SEIEX, Concord, Ontario, L4K 4V8, Canada. Unfortunately, the gain in the Q/TOF's $MS^1$-performance is offset by the fact that only low energy ions (10–40 eV) can be analyzed by $MS^1$. This restriction excludes ions produced by MALDI, which is one of the most versatile and widely used ionization methods.

The velocity selection approach to configuring a tandem TOF mass spectrometer takes advantage of the fact that product-ions resulting from metastable or induced decompositions in a time-of-flight tube retain to the first order the velocity of their precursors (parent ions). This approach is appealing because it offers a means to preserve much of the single TOF mass analyzer's sensitivity and simplicity. The reality to date, however, is that tandem TOF configurations based strictly on velocity selection in $MS^1$ do not. achieve analytically useful resolution in $MS^1$, $MS^2$, or both. To the extent they have succeeded, such instruments have sacrificed one or more of the TOF mass analyzer's three advantageous features: theoretically unlimited mass range, recording without scanning, and simple and inexpensive construction and operation.

The post-source decay (PSD) method introduced by Kaufmann et al. [Kaufmann, R.; Spengler, B.; Lützenkirchen, F. *Rapid Communications in Mass Spectrometry*, 7:902–10 (1993); Kaufmann, R., Kirsch, D., Spengler, B., *International Journal of Mass, Spectrometry and Ion Processes*, Vol. 131:355–85 (1994)], presently is the most widely used form of tandem TOF mass spectrometry based on velocity selection. In addition to being hampered by the general technological failings of current velocity selection configurations, PSD suffers the additional drawback of being inextricably coupled to the MALDI ionization technique. More generally, PSD relies exclusively on the statistically governed processes of metastable decomposition and random gas-phase collisions during flight to produce fragment ions for analysis in $MS^2$. Each of these phenomena tend to be promoted in several compounds under MALDI conditions; hence, the almost inseparable association between PSD and MALDI. When metastable and gas-phase decompositions are not promoted by MALDI (as is often the case with important compounds), PSD provides no recourse to any other means for producing fragment ions.

Tandem time-of-flight mass spectrometers that use velocity selection as the basis for $MS^1$ employ ion deflectors as gates for selecting a band of ions having a desired m/z. The classical geometry for such a gate uses a pair of parallel plates to define a uniform electric field perpendicular to the flight path of the ions. When the electric field is on, it deflects ions that enter the gate so that they do not reach the detector. When the ions to be selected reach the gate, the electric field is switched off to allow those ions to pass through. As soon as the desired ions have passed through the gate, the electric field is switched back on so that ions subsequently entering the gate also are deflected. Parallel plate velocity selectors have relatively large capacitances (5–10 pf); therefore, they are difficult to switch on and off in less than 30–50 ms; shorter switching times are necessary to produce high enough resolving powers ($m/\Delta m$, where m is the mass of the select ions and $\Delta m$ is the range of masses selected) to be effective in tandem TOF mass spectrometers.

A more effective gate geometry than parallel plates is an arrangement of parallel wires. Wires have less capacitance than plates ($\leqq$pf) and can be switched in 5–10 nanoseconds; however, they impart less deflection impulse to passing ions.

Some have achieved slightly better resolutions using dual deflector velocity selectors. With such velocity selectors, the first deflector is initially on so as to deflect ions passing through it, and the second deflector located downstream of the first is initially off. When the desired ions approach, the first deflector is switched off to allow them to pass through without being deflected. As soon as the selected ions pass through the second deflector, again without being deflected, the second deflector is switched on. Although it is possible to make the time between when the first deflector is switched off and the second deflector is switched on smaller than the time it takes to turn a single deflector off and then back on again, dual deflectors operated in this manner have not been able to provide high enough resolving powers to operate very effectively as velocity selectors in tandem TOF mass spectrometers.

If one can ignore the tiny amount of energy released when a molecular ion decays in the flight tube of a TOF instrument, conservation of energy and momentum require that the fragments of the decay (both charged and neutral) continue flight with exactly the same velocity their parent had. Therefore, when particles are selected in the flight tube on the basis of velocity, the selected group can contain nondissociated precursors, fragments of dissociated precursors, or both. If the group does contain nondissociated precursors and some or all of these do dissociate in the length of flight tube remaining between $MS^1$ and $MS^2$, the fragments of those decays would simply continue to fly along with the selected group. Hence, the velocity-selected group of particles enters $MS^2$ of a tandem TOF instrument as a spatially and temporally confined band. At this stage, the kinetic energies of the fragments are proportional to their masses, and the maximum kinetic energy for any fragment equals that of the nondissociated precursor ions, $qV_{ion\ source}$ (where q is the charge carried by a precursor ion). For example, the kinetic energies of the fragments of a 20 keV, 3000 Da precursor ion would essentially cover the range 0–20 keV (1 Da=1/12 of the mass of a single atom of $^{12}C$).

In order to separate particles with identical velocities but different energies, the particles must be accelerated. In current tandem TOF instruments, ion reflection is used to accomplish this task. The selected group (fragments and ions that have not fragmented) are directed into an ion reflector (ion mirror or reflectron), which is the main component of $MS^2$. A typical linear-field reflectron creates a highly uniform axial electric field that accelerates the ions in a direction exactly opposed to the direction of their entry. Thus, ions entering the reflectron at a particular angle of incidence $\phi$ are gradually slowed to a stop and then gradually speeded up in the direction from which they came so that they exit the mirror at a reflected angle exactly equal to ϕ. Providing ϕ is not too large (<2 or 3°), a typical linear-field reflectron is able to focus ions at a space focal plane, located some distance from the exit of the reflectron where a detector is normally mounted. The reflectron will only focus ions of the same mass at its space focal plane if those ions were spaced-focused at its object plane prior to entering it. The neutral fragments in the selected group are not acted upon by electric fields and, therefore, pass straight though the reflectron; the neutrals can be recorded by a detector placed beyond the rear of the reflectron.

Ions entering the reflectron with more kinetic energy will penetrate deeper into the reflectron than ions entering the reflectron with less kinetic energy. Because fragment ions always have less energy than their parent ions, fragment ions exit the reflectron more quickly and reach the detector sooner than their precursors. Not all of these fragment ions will be space-focused at the plane of the detector. Only those ions that require 85–95% of the length of the ion mirror to be reflected will be space-focused when they arrive at the detector. Ions with less energy (lighter ions) will penetrate less deeply into the reflectron and will not be space-focused at the detector. Thus, dispersion by ion reflection can only produce a complete mass spectrum of the fragment ions, similar to one that would be produced by a tandem mass spectrometer, when the voltage of the reflectron is stepped. A partial spectrum is produced with each step, and the partial spectra are assembled in order to produce the complete spectrum. For example, a spectrum covering the mass-range of the product ions of the 20 keV, 3000 Da precursor ion described above can be acquired on existing instruments equipped with a single stage, linear-field reflectron by stepping the reflectron's voltage setting 7–10 times (10–14 times with a double stage ion-reflectron) and recording a segment of the spectrum at each setting. The TOF mass analyzer's highly valued nonscanning feature is sacrificed when it becomes necessary to resort to this time-consuming, sample-wasting, manual stepping procedure.

Cotter's U.S. Pat. No. 5,464,985 discloses a tandem TOF mass spectrometer. Cotter's spectrometer selects precursor ions in $MS^1$ according to their velocity and disperses the fragment ions and nondissociated precursor ions with a reflectron. Cotter avoids the linear reflectrons limited mass range problem by using a curved-field reflectron to record an entire spectrum at a single voltage setting. The curved-field reflectron uses a nonlinear axial electric field to achieve focusing across a wide mass range of product ions without stepping or otherwise changing the reflectron's voltage setting. Despite its elegant conception, the curved-field reflectron is not practical. The curved-field reflectron, which consists of 86 ring elements (instead of 30 or so for a simple linear-field reflectron) connected by 85, 20-turn, 2 MΩ potentiometers (instead of 29 or so uniform fixed resistors), is difficult to construct, is difficult to tune (each potentiometer must be painstakingly adjusted to precisely replicate the required curvature in the axial component of its electric field), is difficult to maintain in tune because of non-uniform drift in the potentiometers' settings, and has low ion-transmission because of the defocusing action of the unavoidable radial component of its electric field. Thus, the TOF mass analyzer's stable operation and simple, low-cost construction are sacrificed in Cotter's spectrometer.

SUMMARY

The present invention overcomes the problems discussed above. The invention provides a tandem time-of-flight mass spectrometer that includes an ion source, an ion selector downstream of the ion source, a dissociation cell downstream of the ion selector, an ion accelerator downstream of the dissociation cell, an ion reflector (ion mirror or reflectron) downstream of the accelerator, a detector that records neutrals and ions transmitted through the reflectron, and a detector that records ions reflected by the reflectron. The spectrometer of the present invention is stable in operation, simple in construction, has high resolving powers, and is able to focus product ions at a space focal plane located at a detector.

In one embodiment of the invention, the mass spectrometer includes an ion source, a velocity selector downstream of the ion source, a dissociation cell downstream of the velocity selector, an ion accelerator downstream of the dissociation cell, the accelerator being capable of focusing ions at a first space focal plane, a reflectron downstream of the accelerator, the reflectron defining an object plane located at the first space focal plane, and the reflectron being capable of focusing ions at a second space focal plane, and an ion detector located at the second space focal plane. The position of the accelerator in this embodiment is particularly advantageous because it accelerates the product ions in a manner that minimizes the effects of the uncertainties of ions leaving the dissociation cell, allows the ions to subsequently separate according to their m/z ratios, and allows the ions to be easily focused at a detector.

The invention also provides a method for producing a mass spectrum that includes accelerating a set of ions to give the set of ions mass-dependant velocities, selecting a subset of the set of ions based on their velocities, inducing dissociation of a fraction of the selected subset of ions if necessary, and detecting the subset of ions. In one embodiment, the method of producing a mass spectrum includes ionizing a material to produce a set of ions. The set of ions is then accelerated to a constant energy so that each ion has a mass-dependant velocity. The accelerated set of ions is allowed to drift along a flight path so that subsets of ions within the set of ions that have different velocities become spatially separated along the flight path. The set of ions, except a select subset of the ions within a narrow, select velocity range, are subsequently deflected from the flight path. In one embodiment, a fraction of the subset of select ions are then induced to dissociate, and the resulting fragment ions along with the remainder of nondissociated ions in the original subset of ions are accelerated along the flight path to mass-dependant velocities, allowed to drift along the flight path so that ions of different velocities spatially separate, and detected at a location along the flight path. The acceleration of the subset of ions along the flight path after the ions dissociate allows the ions to subsequently separate according to their m/z ratios and allows them to be easily focused onto a detector. In one embodiment, the subset of ions are accelerated by an electric field that is switched on once all the ions have moved into the space between the electrodes that create the field, so that the subset of ions will focus at a space focal plane.

The invention also provides a novel velocity selector that is able to attain high resolving powers. A high resolving power corresponds to the selection of a very small range of velocities and, therefore a very small range of masses. An embodiment of the velocity selector includes a first ion deflector having multiple, electrically conductive strips that define multiple channels. The strips include alternate positive voltage strips connected to a first positive voltage source, and alternate negative voltage strips connected to a first negative voltage source. A second ion deflector is in series with the first ion deflector. The second ion deflector includes multiple, electrically conductive strips defining multiple channels. The strips include alternate positive voltage strips connected to a second positive voltage source, and alternate negative voltage strips connected to a second negative voltage source. The strips can impart sufficient deflection impulse to passing ions, and yet their low capacitance enables short switching times.

The invention also provides a method for selecting a subset of ions from a set of ions. In one embodiment, the method includes accelerating a set of ions in the ion source so the ions have varying velocities, and allowing the set of ions to move along a flight path so that ions of different velocities spatially separate along the flight path. A voltage is applied across a first ion deflector positioned along the flight path so as to deflect ions passing through the first deflector in a first direction away from the flight path. The voltage across the first deflector is switched off so that a subset of ions having a select range of velocities is deflected less in the first direction than preceding ions, and a voltage across a second ion deflector arranged downstream of the first deflector switched on so as to deflect ions passing through the second deflector in a second direction, which is exactly opposite the first direction. The voltages and switching times are such that the second deflector deflects the subset of ions with the select velocity back along the flight path but deflects ions following the subset of ions with the select velocity away from the flight path in the second direction. The method of ion selection produces particularly high resolving powers because it allows the electric fields generated by the deflectors to interact dynamically with the subset of ions with the select velocity as they pass through the deflectors.

DETAILED DESCRIPTION

Figure 1:
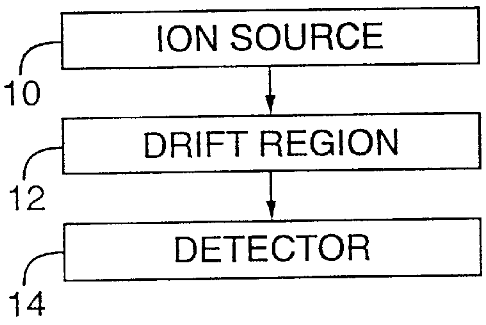
FIG. 1 is a block diagram illustrating a conventional time-of-flight mass spectrometer.

Referring first to FIG. 1, in a conventional single TOF mass spectrometer an ion source 10 ionizes a sample and accelerates the resulting set of ions in a brief burst. The ionization process imparts a small amount of kinetic energy to a newly created ion; this initial kinetic energy varies in magnitude from ion-to-ion and is, therefore, responsible for an uncertainty in the total kinetic energy of an ion after it has been accelerated. A typical accelerator within the ion source 10 creates an electric field so that the kinetic energy of an ion leaving the accelerator is mainly a function of the charge (z) of the ion. Thus, all ions with the same charge will have substantially the same kinetic energy when leaving the ion source 10. Since kinetic energy is $\frac{1}{2}mv^2$, where m is mass and v is velocity, the velocity of an ion leaving the ion source 10 is inversely proportional to the square root of the mass.

After leaving the ion source 10, the set of ions then passes through a drift region 12. As the ions pass through the drift region 12, the ions with greater velocities get ahead of the ions with smaller velocities. Since the velocities are based on the mass and charge of the ions, the set of ions becomes spatially separated into bands, with each band containing ions of a particular m/z value. The ions then reach a detector 14, which detects the presence of the ions. A mass spectrum is produced in the form of a plot of the number of ions striking the detector 14 versus time.

Figure 2:
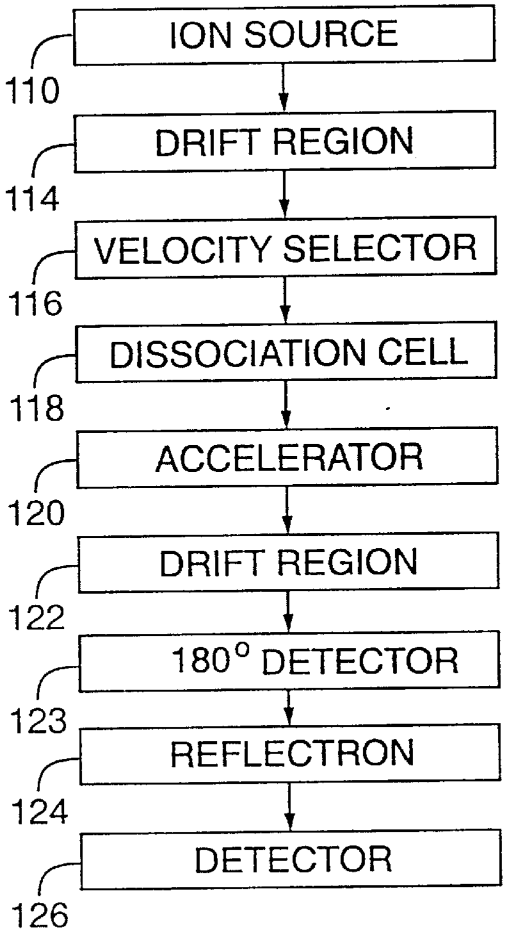
FIG. 2 is a block diagram illustrating a tandem time-of-flight mass spectrometer according to the present invention.

FIG. 2 illustrates in block form a tandem TOF mass spectrometer according to the present invention. A set of ions is produced and accelerated by an ion source 110 through a first drift region 114 substantially as described above. However, at the end of the drift region 114 the set of ions enters a velocity selector 116, which deflects all of the ions except a select subset or band of ions (called precursor ions) having a select velocity range, and thus a select m/z range. The precursor ions then pass into a dissociation cell 118 where, if necessary, at least a portion of the precursor ions can be dissociated or fragmented into smaller product ions. The resulting product ions are then further accelerated in the same direction as their initial velocity by a second accelerator 120. The product ions then pass through a second drift region 122 toward a reflectron 124. The reflectron 124 reflects the product ions and focuses them onto a detector 126. A mass spectrum of the subset of ions, which consists of precursor and product ions, is then produced in the form of a plot of the number of product ions striking the detector 126 versus time.

Apparatus

Figure 3:
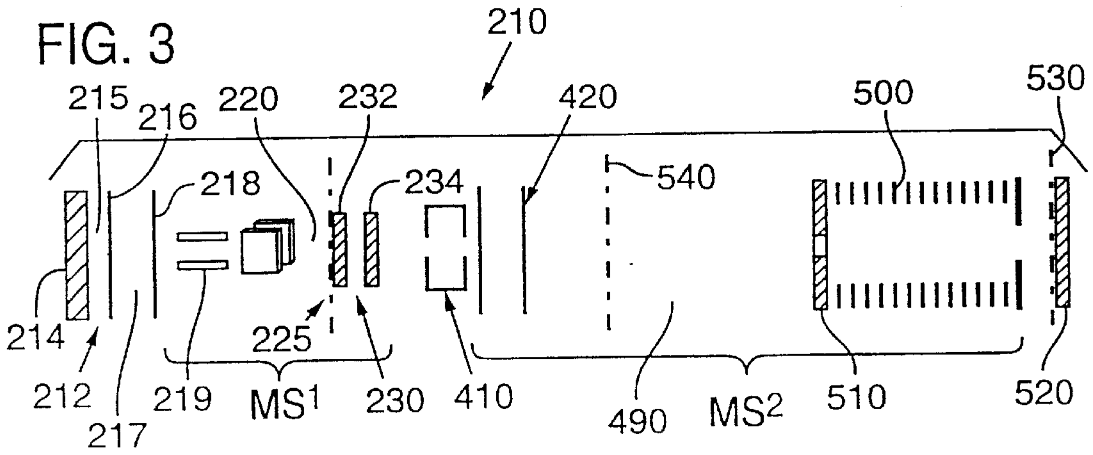
FIG. 3 is a schematic diagram of a tandem time-of-flight mass spectrometer according to the present invention.

Referring to FIG. 3, a tandem TOF apparatus 210 of the present invention includes an ion source 212. In a preferred embodiment, the ion source 212 includes a repeller plate 214

(which also can serve as a sample probe for certain ionization processes), an ion extractor/accelerator grid 216, and a grounded exit grid 218. The accelerated ions must be focused by the ion source at a select plane. In a preferred embodiment, the ion source 212 is a two-stage ion source, such as the one disclosed by Wiley and McLaren, which can be operated in a space-focusing or time-lag-focusing mode. The ion extractor/accelerator 216 divides the ion source 212 into an extraction region 215 and an acceleration region 217. Ions can be formed directly in the extraction region 215 and subsequently accelerated out of the ion source 212 along the flight-axis 211 (not shown) that runs from the center of the repeller plate 214 at the back of the ion source 212 to the center of the ion detector 520 located behind the reflection 500 (axial extraction). Alternatively, ions can be formed outside the extraction region 212, injected into the extraction region 212 orthogonally to the flight-axis 211, and subsequently accelerated out of the ion source 212 along the flight-axis 211 (orthogonal extraction). The electric potentials (voltages) of the repeller plate 214 and the extractor/accelerator grid 216 are set at levels such that the first electric field $E_e$ in the extraction region 215 is lower than the second electric field $E_a$ in the acceleration region 217 immediately downstream of the first electric field $E_e$. In the original Wiley and McLaren ion source, the electric fields were adjusted to the ratio $E_a/E_e=4$; in any given ion source the ratio used will vary somewhat from the Wiley and McLaren value depending on the mass range of the ions being analyzed, the dimensions of the ion source, and the distance to the space focal plane of the ion source. The construction and operation of such an accelerator is well known to those of ordinary skill in the art.

The two-stage ion sources, operating either by axial extraction or orthogonal extraction as the case may require, will produce advantageous results with a variety of ionization processes. Suitable ionization processes include, without limitation, electron impact, chemical ionization, photoionization, field ionization, inductively coupled plasma, spark source, thermal surface desorption, field desorption, fast ion or atom bombardment, fast heavy ion desorption, matrix-assisted laser desorption/ionization (MALDI), thermospray, atmospheric pressure ionization, and electrospray ionization (ESI). MALDI (axial or orthogonal extraction) and ESI (orthogonal extraction) are preferred processes for ionizing molecules greater than about 1,000 u, such as proteins, oligonucleotides and synthetic polymers.

In a preferred embodiment, a short length of flight tube (not shown) connects the ion source 212 to two sets of deflection plates 219. The two sets of deflection plates 219 are located in series along the flight-axis 211, and they are oriented with respect to the flight-axis 211 and with respect to each other to deflect ions away from the flight axis 211 in directions that are orthogonal to each other. Plates 219 are located downstream of the ion source 212 so they can be used to make any necessary corrections to the flight paths of the ions as they exit the ion source 212 to steer the ions substantially parallel to the flight-axis 211.

A drift region 220 is located downstream of the deflection plates 219. In a preferred embodiment the drift region is a field-free (i.e., having no electro-magnetic field) flight tube through which ions pass.

A velocity selector 230 is located downstream of the drift region 220. The distance from the exit grid 218 of the ion source 212 to the entrance plane of the velocity selector is designated $D_1$, $D_1$ generally is greater than 200 mm but less than 1,000 mm.

Figure 4:
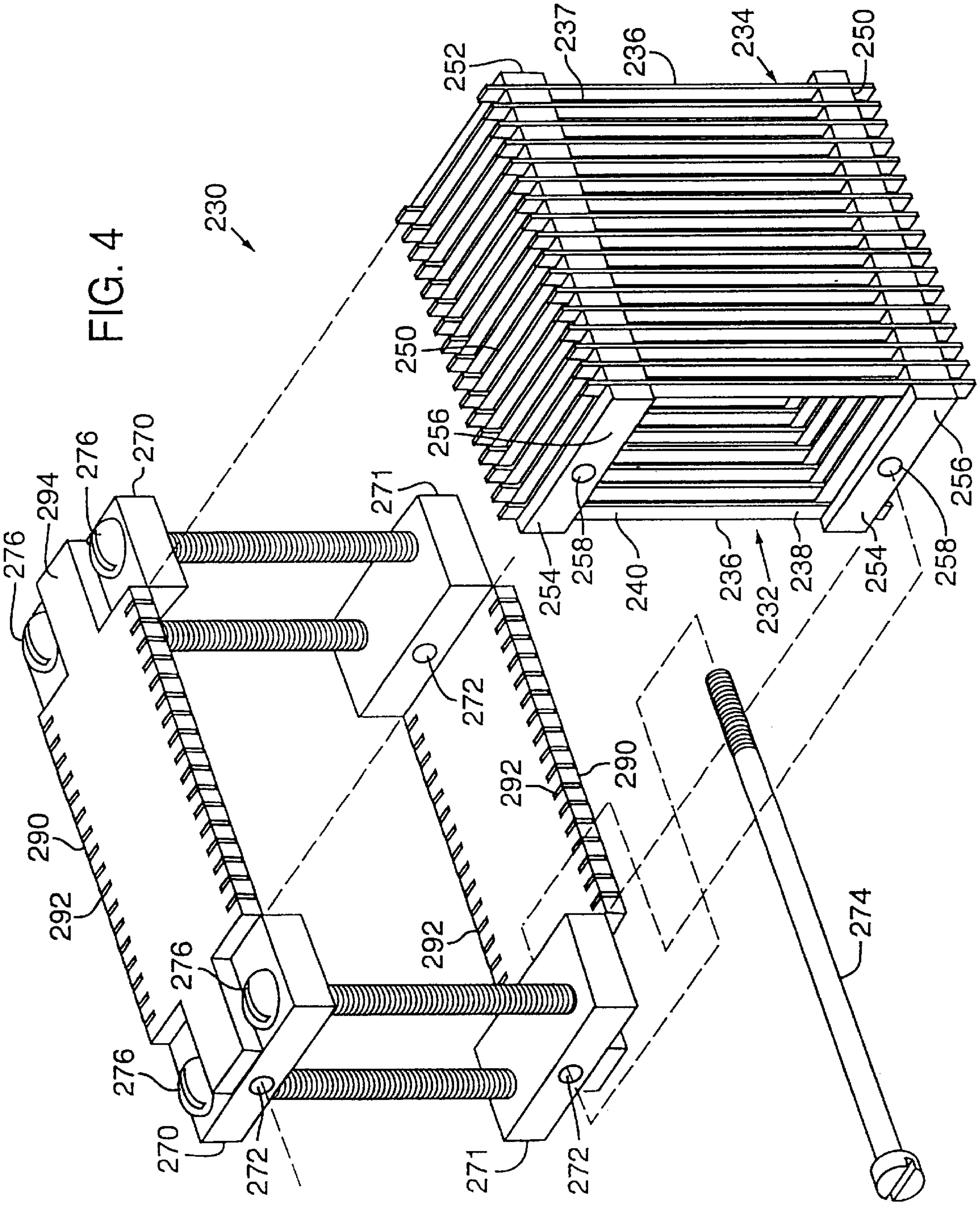
FIG. 4 is an exploded perspective view of a velocity selector according to the present invention.
Figure 5:
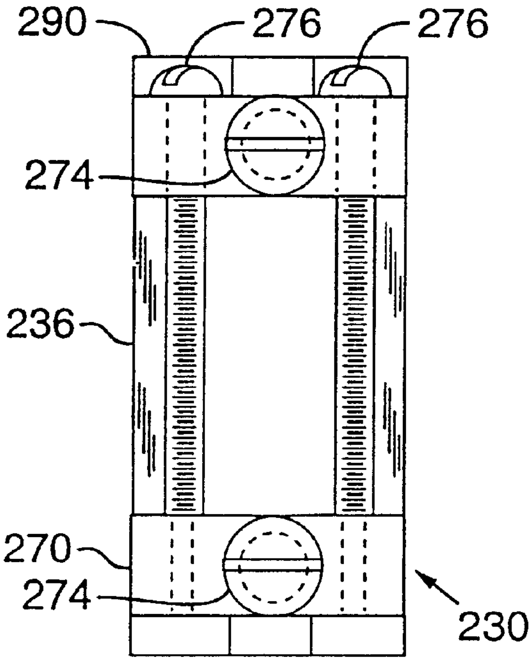
FIG. 5 is a side view of the velocity selector of FIG. 4.
Figure 6:
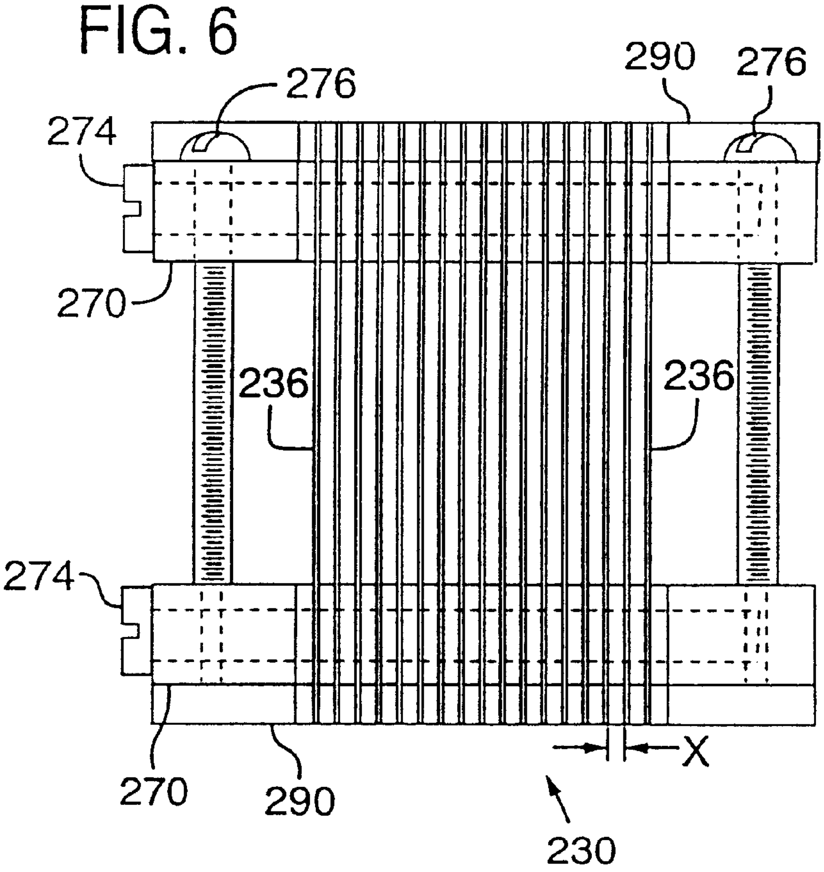
FIG. 6 is a front view of the velocity selector of FIG. 4.

FIGS. 4–6 illustrate a working embodiment of velocity selector 230. The velocity selector 230 includes a first ion deflector 232 and a second ion deflector 234. Both deflectors 232, 234 are required if the velocity selector is operated in a dual deflector mode, but only one deflector is required if the velocity selector is operated in a single deflector mode. Referring now to FIG. 4, each deflector 232, 234 includes multiple conductive strips, or electrodes, 236. Strips 236 are of the same shape and dimensions and are parallel to one another. Strips 236 within each ion deflector 232, 234 define channels 237 between the strips. Each elongated strip 236 has a first end 238 disposed between a pair of spacers 250, 252, and a second opposed end 240 disposed between another pair of spacers 250, 252, so as to form an alternating series of spacers 250, 252 and strips 236.

The strips 236 are made of a conductive material, such as a metal or an alloy. A partial list of suitable materials for forming strips 236 includes nickel-chrome alloys, stainless steel and copper-beryllium alloys. The dimensions of the strips 236 can vary, depending on factors such as spectrometer performance, and construction considerations, such as the size of the device. The thickness of strips 236 generally varies from about 0.05 mm to about 0.10 mm. Transmission improves as thickness decreases. A preferred thickness is achieved by selecting a minimum thickness for providing a desired mechanical stability.

The width of strips 236 generally varies from about 1 mm to about 1.5 mm. But, deflector power is directly proportional to the ratio strip width/strip spacing, where ratio values greater than 1 assure that the ions receive a strong deflection pulse. Wire deflectors have strip width/strip spacing ratios much less than 1.

The length of strips 236 also can vary, and a preferred length for a particular device is determined by considering a) size of the device, and b) maintaining a homogeneous electric field over an area larger than the width of the ion beam. In a working embodiment, each strip 236 was made of nickel-chrome ribbon wire that was 0.09 mm thick, 1.27 mm wide, and 15 mm long.

An end spacer 252 is located at the termini of each series of spacers 250, so that each of the four end spacers 252 is adjacent to only one pair of co-planar strips 236, while each inner spacer 250 is disposed between two pairs of co-planar strips. Each spacer 250, 252 extends between the first deflector 232 and the second deflector 234, and abuts at least one strip 236 of the first deflector 232 at a first end 254 and one strip 236 of the second deflector 234 at a second end 256.

Each spacer 250, 252 further defines a transverse aperture 258. Aperture 258 extends normal to the strips 236 intermediate the first end 254 and the second end 256.

Spacers 250, as the name implies, space strips 236 apart to produce the channels 237. The inner spacers 250 in a working embodiment spaced the strips 236 1-mm apart from center-to-center (illustrated as distance "x" in FIG. 6). The distance between adjacent strips 236 is preferably small enough so that a sufficiently large electric field will be produced within the channels 237, but it is preferably large enough so that the strips 236 do not become a significant obstruction in the path of the ions. Spacing is determined by considering ion transmission and field homogeneity. Decreasing the spacing reduces transmission and increases homogeneity. The spacers 250, 252 are machined from insulating material, such as Delrin® or VESPEL®.

Each series of spacers 250, 252 is positioned between a pair of clamp blocks 270, 271 abutting the end spacers 252. Each clamp block 270, 271 defines an aperture 272 that aligns with the aperture 258 in the series of spacers 250, 252. Clamp bolts 274 extend through the apertures 272 in the clamp blocks 270, 271 and the apertures 258 in the spacers 250, 252. Clamp bolts 274 clamp the spacers 250, 252 and the strips 236 between the clamp blocks 270.

Each upper clamp block 270 further defines a pair of threaded apertures (not shown) that are normal to the major planar surfaces of clamp blocks 270. Each lower clamp block 271 further defines a pair of unthreaded apertures (not shown) that are normal to the major planar surfaces of clamp blocks 271. Four machine screws 276 were produced by removing, such as by machining away, threading on the ends. Screws 276 are threaded almost completely through the apertures in the upper clamp blocks 270 so that the unthreaded ends of screws 276 extend between upper clamp blocks 270 and lower clamp blocks 271 and are seated in the unthreaded apertures in the lower clamp blocks 271. The upper clamp blocks 270 are spread apart from the lower clamp blocks 271 by advancing the screws 276 in the threaded apertures in the upper clamp blocks 270. The upper clamp blocks 270 are spread apart from the lower clamp blocks 271 so that strips 236 are taut and aligned parallel to one another.

Plate 290 extends between blocks 270, 271 and along each series of spacers 250, 252. Plate 290 includes slots 292 formed therein that are sized and shaped to receive the termini of the strips 236. The plates 290 also have protrusions 294 at each end that extends along the clamp blocks 270 intermediate the termini of the bolts 276. The plates 290 serve as mounting pieces for the entire velocity selector 290; they can be customized as necessary for mounting the velocity selector 290 in any given flight tube. The clamp blocks 270, 271 and the plates 290 are machined from insulating materials, such as those used to make the spacers 250,252.

Figure 7:
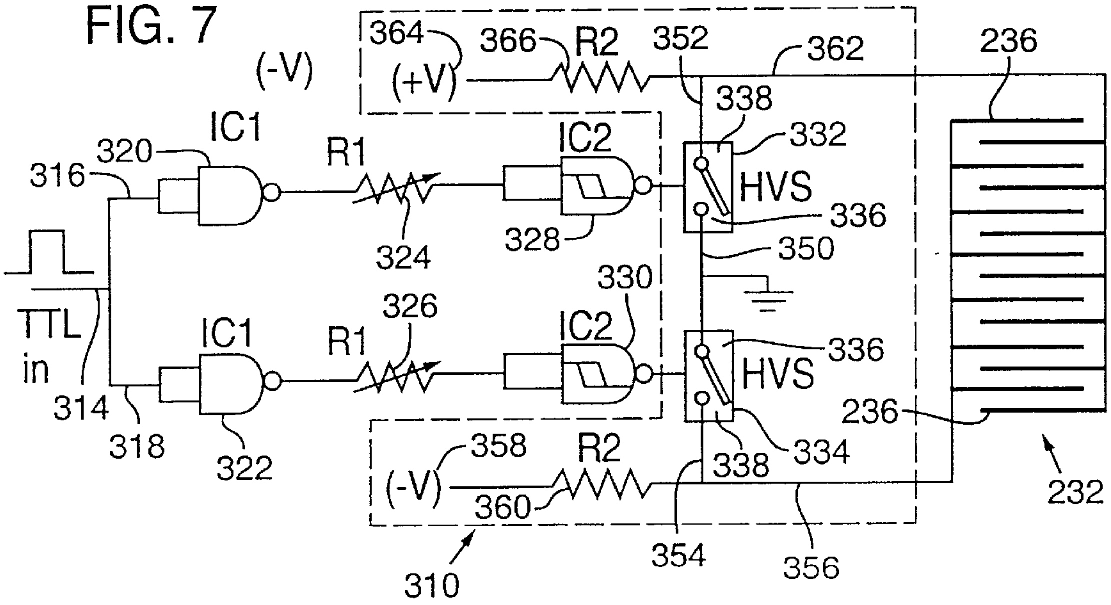
FIG. 7 is a schematic diagram of the circuitry for the first ion deflector of the velocity selector of the present invention if the velocity selector is operated in the dual deflector mode.
Figure 8:
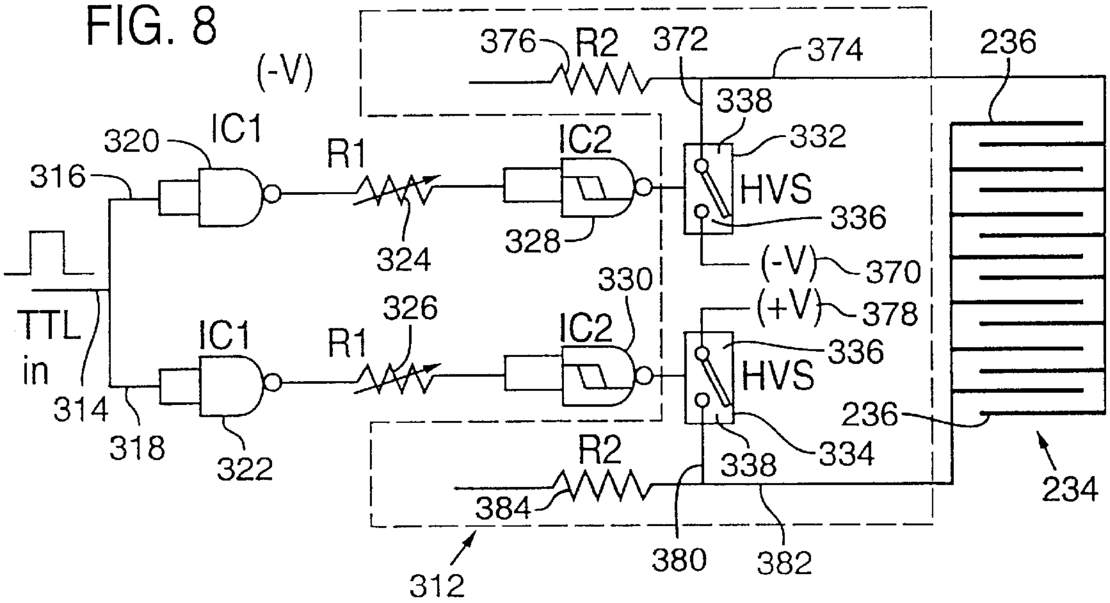
FIG. 8 is a schematic diagram of the circuitry for the second ion deflector, of a velocity selector according to the present invention if the velocity selector is operated in the dual deflector mode.
Figure 9:
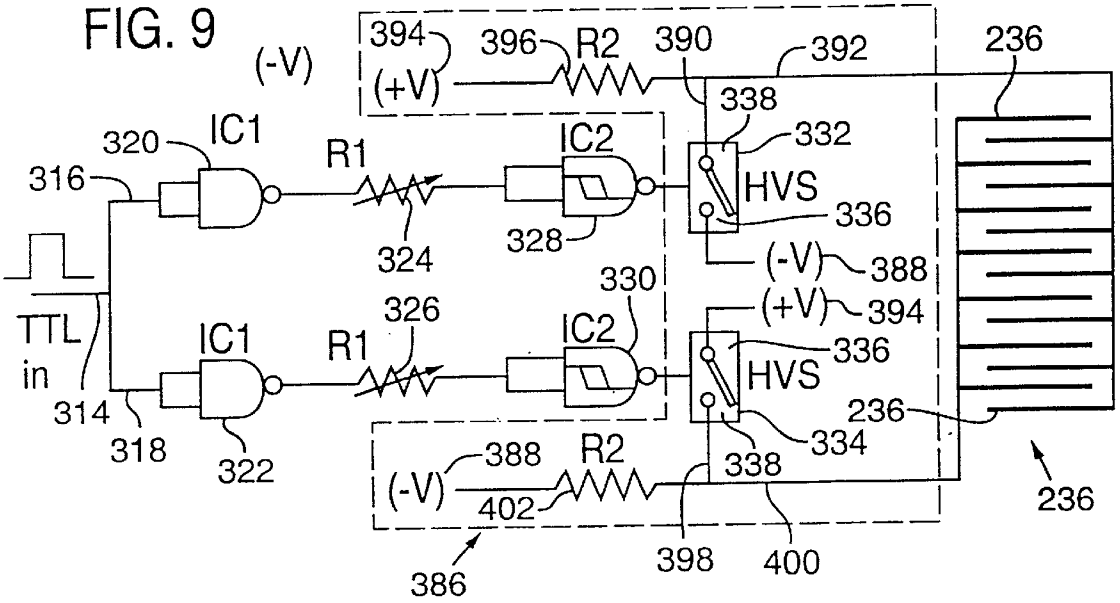
FIG. 9 is a schematic diagram of the circuitry for the single ion deflector of a velocity selector according to the present invention if the velocity selector is operated in the single deflector mode.

Alternating strips 236 are connected to positive and negative voltage sources, respectively. This allows the formation of an electric field within each channel 237 defined by adjacent strips 236. Electronic switches allow the voltages to be switched so as to turn the electric field on and off or to reverse the electric field, whichever is desired. FIG. 7 illustrates the circuitry 310 for switching the voltage from on to off within the first ion deflector 232, also referred to as entry deflector 232. FIG. 8 illustrates the circuitry 312 for switching the voltage from off to on within the second ion deflector, or exit deflector 234. FIG. 9 illustrates the circuitry 386 for reversing the voltages applied to alternate strips 236 of the first ion deflector 232 or the second ion deflector 234. Strips 236 reduce switching times because they do not have large capacitance.

Referring now to FIGS. 7–9, the circuitry 310, 312 for each ion deflector 232, 234 in the dual deflector mode and the circuitry 386 for the first ion deflector in the single deflector mode includes an entry line 314 for carrying a transistor transistor logic (TTL) pulse. The entry line 314 is split into a pair of parallel lines 316, 318. Each parallel line 316, 318 enters a first NAND gate (IC1) 320, 322, proceeds through a variable resistor (R1) 324, 326, and then to a second NAND gate (IC2) 328, 330. Each parallel line then proceeds to a high voltage switch (HVS) 332, 334, which includes a first side, 336 and a second side 338. The HVSs are MOSFETs capable of switching 500 V or more in a few nanoseconds. In a working embodiment, two Behlke HTS 30 switches were used as HVSs 332, 334. IC2 is a Schmitt-triggered NAND gate that minimizes distortion in the TTL pulse delivered to the input of the HVSs 332, 334.

Referring now to FIG. 7, and the first deflector circuitry 310 for the velocity selector 230 when operating in the dual deflector mode, each HVS 332, 334 is connected on the first side 336 to a line 350 leading to the ground for the apparatus 210, and on the second side 338 to a line 352, 354. The line 354 extends from HVS 334 to a junction with a negative voltage line 356. The negative voltage line 356 connects a negative voltage source (−V) 358 to the alternating negative-voltage deflector strips 236. The negative voltage line 356 includes a resistor (R2) 360 intermediate the junction with the line 354 and the negative voltage source 358. The line 352 leads to a junction with a positive voltage line 362. The positive voltage line 362 connects a positive voltage source (+V) 364 to the alternating positive voltage deflector strips 236. The positive voltage line 362 includes a resistor (R2) 366 intermediate the junction with the line 352 and the positive voltage source 364. Thus, the strips 236 are connected to the positive voltage source 364 and the negative voltage source 358 (i.e., the first deflector 232 is "on") when the HVSs 332, 334 are open. Strips 236 are connected to the ground for the apparatus 210 (i.e., the first deflector is "off") when the HVS's 232, 234 are closed. Connections between each HVS 332, 334 and the first deflector 232 are preferably kept as short as possible to minimize the system's capacitance. The first deflector circuitry 310 allows the first deflector 232 to be switched from on to off in as little as about 19 nanoseconds (see FIG. 12). Referring now to FIG. 8, and the second deflector circuitry 312 for the velocity selector 230 when operating in the dual deflector mode, the first side 336 of the HVS 332 is connected to a negative voltage source (−V) 370. The second side 338 of the HVS 332 is connected to a line 372 that leads to a junction with a ground line 374 that extends between the ground for the apparatus 210 and the negative voltage strips 236. The ground line 374 includes a resistor (R2) 376, preferably having a resistance of from about 200 ohms to about 500 ohms, intermediate the ground and the junction with the line 372. The HVS 334 is connected on the first side 336 to a positive voltage source (+V) 378 and on the second side 338 to a line 380 that leads to a ground line 382. The ground line 382 includes a resistor (R2) 384 intermediate the system ground and the junction with the line 380. Strips 236 of the second deflector 234 are connected to the positive voltage source 364 and the negative voltage source 358 (i.e., the second deflector 234 is "on") when the HVSs 332, 334 are closed. Strips 236 are connected to the ground for the apparatus 210 (i.e., the second deflector 234 is "off") when the HVSs 332, 334 are open. Connections between each HVS, 332, 334 and the second deflector 234 are preferably kept as short as possible in order to minimize the system's capacitance. The second deflector circuitry 312 allows the second deflector 234 to be switched from off to on in as little as about 19 nanoseconds. When the velocity selector 230 is operated in single deflector mode, the circuitry 386 illustrated in FIG. 9 may be connected to either the first deflector 232 or the second deflector 234. The first side 336 of the HVS 332 is connected to a negative voltage source (−V) 388. The second side 338 of the HVS 332 is connected to a line 390 that leads to a junction with a positive voltage line 392 that extends between a positive voltage source (+V) 394 and the high voltage strips 236. The positive voltage line 392 includes a resistor (R2) 396, preferably having a resistance of from about 200 ohms to about 500 ohms, intermediate the positive voltage source 394 and the junction with the line 390. The HVS 334 is connected on the first side 336 to the positive voltage source (+V) 394 and on the second side 338 to a line 398 that leads to a negative voltage line 400. The negative voltage line 400 includes a resistor (R2) 402 intermediate the negative voltage source 388 and the junction with the line 398. Alternate strips 236 of the gate 232, 234 are connected respectively to the positive voltage source 394 and the negative voltage source 388 when the HVSs 332, 334 are closed. When the HVSs 332, 334 are open, the voltage on each strip 236 is reversed (i.e., a strip that is connected to the positive voltage source 394 when the HVSs 332, 334 are open will be connected to the negative voltage source 388 when the HVSs are closed). Connections between each HVS, 332, 334 and the ion deflector 232 or 234 are preferably kept as short as possible in order to minimize the system's capacitance. The single deflector circuitry 386 allows the ion deflector 232 or 234 to be switched in as little as about 19 nanoseconds.

The best resolving power of velocity selectors known prior to the present invention is about 1:200. The resolving power of the time-of-flight velocity selector of the present invention can be varied by the operator. An instrument having a single-stage velocity selector 230 as illustrated in FIGS. 4–6 can achieve a mass resolution of at least 1:5,000 at mass 5,000 u. For example, if a compound of interest has a molecular weight of 5,000 u (atomic mass units), a resolution of 1:5000 would mean that the instrument would produce distinctly different signals for ions having masses of 5,000 and 5,000±1 u (i.e., 1/5000=0.0002. 0.0002×5,000 u=1 u). Conventional instruments known prior to the present invention could not make such determinations. Typical resolving powers for currently available instruments are less than 100 at masses in the range of about 5,000 u, no conventional instrument can achieve a resolving power of greater than 100 at mass 5,000 u. With a sample having a molecular weight of about 5,000 u, a conventional instrument could, at the very best, detect mass differences between ions having masses of 5,000 and 5,000±50 u (1/100=0.01; 0.01×5,000 u=50 u). Resolving powers of about 200 have been achieved on conventional instruments at masses of about 200.

Referring back to FIG. 3, the apparatus 210 preferably includes a dissociation cell 410 downstream of the velocity selector 230. The distance separating the velocity selector 230 and the dissociation cell 410 preferably is about one half the distance separating the velocity selector 230 and the ion accelerator 420, which is located immediately downstream of the dissociation cell 410. The dissociation cell 410 (or collision cell) preferably is a commercial cell or a custom-built cell patterned after a standard cell. A collision cell is a small chamber mounted in the ion path of the mass spectrometer. The collision cell has two small openings, one to let the precursor ions in and the second to let the product ions and surviving precursor ions out. The chamber can be pressurized, usually to $10^{-4}$–$10^{-3}$ torr, with a gas. As they pass through the cell, the precursor ions collide with the gas, thereby activating or inducing their decomposition or fragmentation to product ions. The collision cell is differentially pumped so that the collision gas does not interfere with proper operation of other parts of the mass spectrometer(s). The collision cell is mounted in an appropriate field-free region, that is, between the mass-selective devices.

Figure 10:
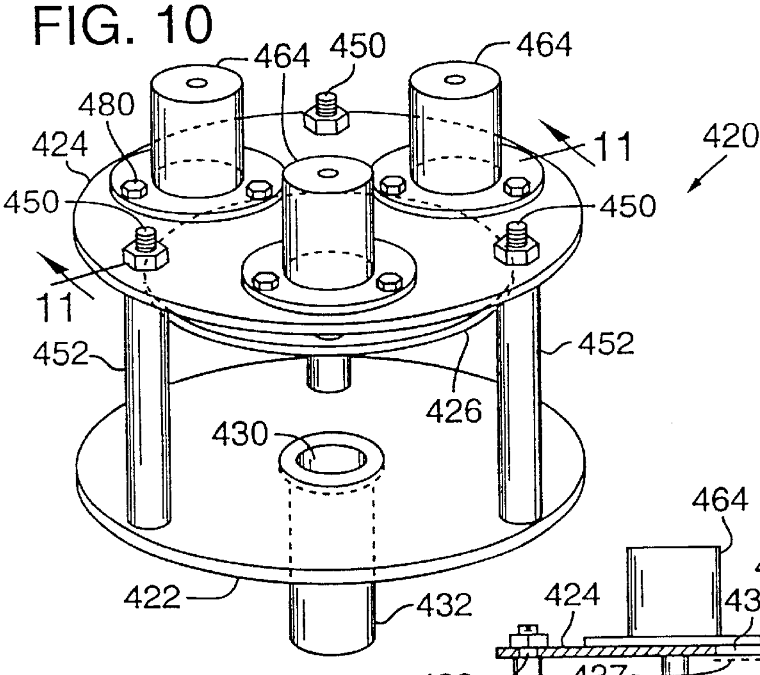
FIG. 10 is a perspective view of the post velocity selection ion accelerator according to the present invention.
Figure 11:
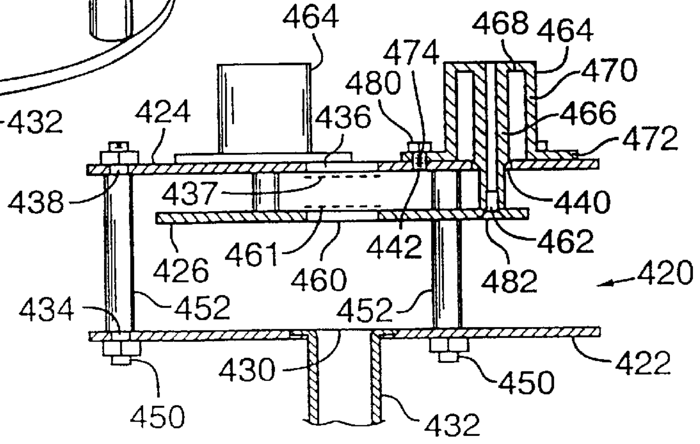
FIG. 11 is a sectional view taken along line 11—11 in FIG. 10.

A post velocity selection ion accelerator 420 is located downstream of the dissociation cell 410. Referring now to FIGS. 10 and 11 and the illustrated single-stage accelerator, the accelerator 420 preferably includes a circular bottom assembly plate 422, a circular top assembly plate 424, and a circular accelerator plate 426 intermediate the top and bottom assembly plates. The top assembly plate 424, the bottom assembly plate 422, and the accelerator plate 426 are coaxial. The distance from the entry plane of the velocity selector 230 to the accelerator plate 426 of the accelerator 420 is designated $D_2$. The distance separating the accelerating plate 426 from the top assembly plate 424 is designated d. $D_2$ should be sufficient to accommodate the dissociation cell 410 and accelerator 420, i.e., approximately 2–3d, and more typically is greater than about 10d. A working embodiment of accelerator 420 has been made having $D_2$=15d. It should be appreciated that resolution increases as $D_2$ increases.

Figure 15:
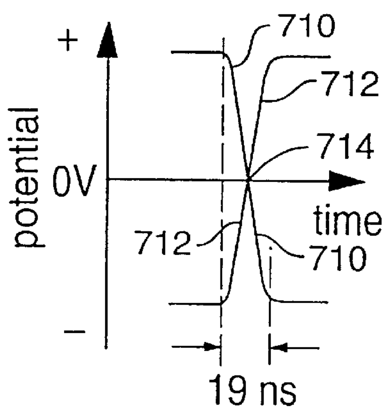
FIG. 15 is a plot of the ion deflector voltage as a function of time during operation of a velocity selector in the single deflector mode according to the present invention.
Figure 16:
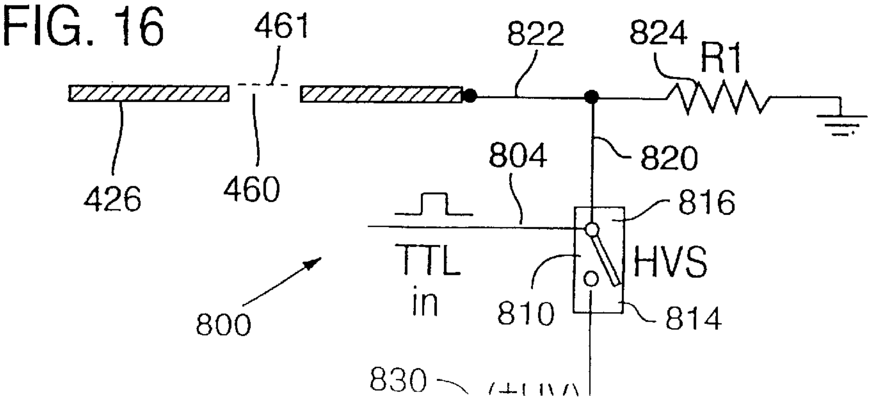
FIG. 16 is a schematic diagram of the circuitry for an accelerator according to a working embodiment of the present invention.

The accelerator plate 426 is connected to high voltage switching circuitry (see FIG. 15) so that it can be switched from off to on. Top assembly plate 424 is connected to the ground for the apparatus 210. FIG. 15 shows the circuitry for the accelerator 420. The circuitry 800 for the accelerator 420 includes an entry line 804 for carrying a TTL triggering pulse to a high voltage switch (HVS) 810, which includes a first side 814 and a second side 816. The HVS is capable of switching +15 kv or more in 20 ns or less; suitable for this purpose would be, for example, a Behlke HTS 151A, 151B, or 301 fast high voltage transistor switch. The first side 814 of HVS 810 is connected to a positive or negative high voltage source (+HV) 830. When a positive high voltage source is used, the accelerator 420 accelerates positive ions, and when a negative high voltage source is used, the accelerator 420 accelerates negative ions. The second side 816 of HVS 810 is connected to a line 820 that leads to a junction with a ground line 822 that extends between the ground for the apparatus 210 and the accelerator plate 426. The ground line 822 includes a resistor (R1) 824 intermediate the system ground and the junction with line 820. The accelerator plate 426 is connected to the ground for the apparatus 210 (i.e., the accelerator 420 is "off") when HVS 810 is open. The accelerator plate 426 is connected to the high voltage source 830 (i.e., the accelerator 420 is "on") when HVS 810 is closed. Connections between HVS 810 and the accelerator plate 426 are preferably kept as short as possible in order to minimize the system's capacitance. The accelerator circuitry 800 allows the accelerator 420 to be switched from off to on in as little as about 20 nanoseconds.

Referring now to FIG. 10, the bottom assembly plate 422 defines a centrally located aperture 430. Aperture 430 is adapted to receive a flight tube 432 that extends from the dissociation cell 410 and provides an entrance to the accelerator 420. A working embodiment of bottom assembly plate 422 also defines three bolt apertures 434 spaced at 120° circumferentially about the periphery of the bottom assembly plate.

Top assembly plate 424 defines a centrally located aperture 436 adapted to receive a flight tube (not shown) that extends from the exit of the accelerator 420. The aperture 436 is covered on the side of plate 424 facing toward the accelerator plate 426 with a high-transmission, conductive grid 437. A working embodiment of accelerator 420 used a 937 transmission nickel mesh for grid 437. A working embodiment of accelerator 420 used a top assembly plate 424 that included bolt apertures 438 spaced circumferentially at 120° about the periphery of the top assembly plate and circumferentially spaced receiving apertures 440 intermediate the bolt apertures. The top assembly plate 424 also defined threaded bolt apertures 442 circumferentially spaced about each of the receiving apertures 440.

Bolt apertures 438 defined by the top assembly plate 424 align with the bolt apertures 434 defined by the bottom assembly plate 422. Bolts 450 extend between the apertures 438 defined by the top assembly plate 424 and apertures 434 defined by the bottom assembly plate 422. Tubular spacers 452, which are made of an insulating material, are disposed around the bolts 450 and abut the top assembly plate 424 and the bottom assembly plate 422 on opposing ends of the tubular spacers. Bolts 450 are secured in place to connect the top assembly plate 424 to the bottom assembly plate 422.

Accelerator plate 426 intermediate the bottom assembly plate 422 and the top assembly plate 424 defines a centrally located aperture 460 that is coaxial with the centrally located aperture 430 on the bottom assembly plate and the centrally located aperture 436 on the top assembly plate. The aperture 460 is covered on the side of accelerator plate 426 facing toward the top assembly plate 424 with a high-transmission conductive grid 461. A working embodiment of accelerator 420 used a 93% transmission nickel mesh for grid 461. Accelerator plate 426 also defines circumferentially spaced bolt apertures 462 that align with the receiving apertures 440 in the top assembly plate 424.

High-voltage insulating mounts 464 connect the accelerator plate 426 to the top assembly plate 424. Each mount 464 includes: an inner tubular portion 466; a radial wall 468 that extends outwardly from a terminus of the inner tubular portion; a circumferential wall 470 that extends axially from the periphery of the radial wall so that it is disposed around a length of the inner tubular portion 466; and a flange 472 that extends outwardly from a terminus of the circumferential wall 470 distal the radial wall 468. The flange 472 defines bolt apertures 474 spaced circumferentially thereabout. Inner tubular portion 466 distal the radial wall 468 is threaded to receive threaded fasteners.

The flange 472 of each mount 464 is adjacent the side of the top assembly plate 424 facing away from the accelerator plate 426. The circumferential wall 470 extends away from the top assembly plate 424. Inner tubular portion 466 extends through a receiving aperture 440 and abuts the accelerator plate 426. The bolt apertures 474 in each flange 472 align with the threaded bolt apertures 442 spaced circumferentially about the receiving apertures 440 in the top assembly plate 424. Bolts 480 extend through the bolt apertures 474 and into the threaded bolt apertures 442 to secure the mounts 464 to the top assembly plate 424. Inner tubular portion 466 of each mount 464 aligns with one of the bolt apertures 462 in the accelerator plate 426. Bolts 482 extend through the bolt apertures 462 and engage the internal threads in the inner tubular portions 466 to secure the accelerator plate 426 to the mounts 464, and thus secure the accelerator plate 426 to the top assembly plate 424 without electrically connecting the accelerator plate to the top assembly plate. Assembly plates, such as top assembly plate 424, and accelerator plate 426 are made from materials such as stainless steel, brass or molybdenum, with stainless steel currently being preferred because of its machineability, strength, vacuum compatability, and cleanability. Accelerator 420 may be constructed in any manner that defines a flight path and produces an axial electric field along that flight path. Accelerator 420 is capable of receiving ions having an initial velocity substantially in the direction of the flight-axis 211 and accelerating those ions in the direction of the flight axis 211.

Figure 12:
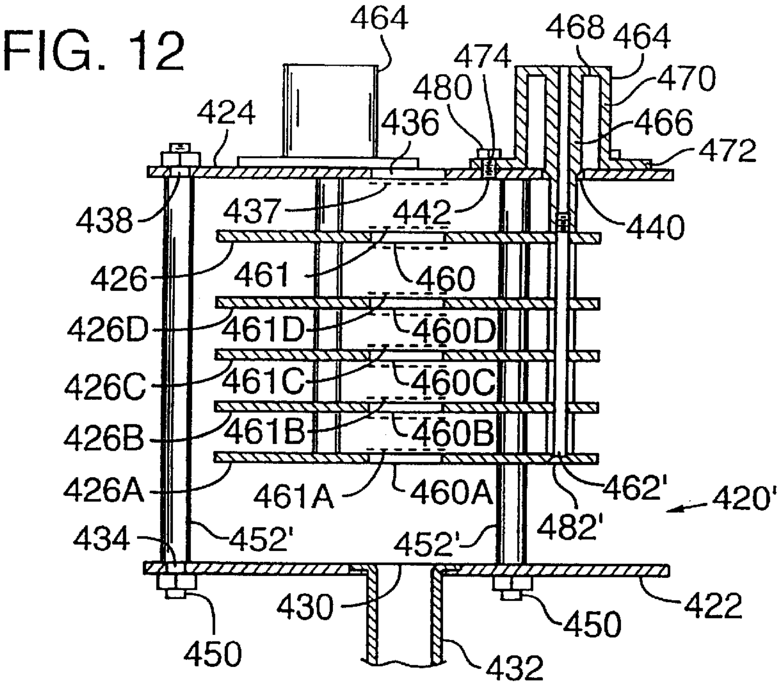
FIG. 12 is a sectional view of an alternative embodiment of an ion accelerator having plural stages of ion acceleration.

FIG. 12 illustrates one embodiment of a multi-stage accelerator 420' (three acceleration stages are illustrated in FIG. 12). Accelerator 420' includes a first acceleration stage as produced by paired accelerator plates 424 and 426. Two additional acceleration stages are illustrated by FIG. 12, as produced by paired accelerator plates 426A, 426B and 426C, 426D. The accelerator plates 426 are made from materials, and are mounted, as stated above with reference to the embodiment illustrated in FIG. 11.

The accelerator plates 424 and 426 include centrally located apertures 460. Apertures 460 are coaxial with the centrally located aperture 430 on the bottom assembly plate 422 and the centrally located aperture 436 on the top assembly plate 424.

Ions that enter the accelerator 420 or 420' are initially spaced within the accelerator and are not space focused ("space focused" means that ions of substantially equal masses arrive at the same plane in space at a given time). Accelerators 420 and 420' space focus the ions. Accelerator 420 and 420' remain at zero voltage until all select ions isolated by the velocity selector 230, including fragments of these ions, are within the accelerators. In the single-stage embodiment, a voltage is then applied to the accelerator plate 426. Ions of a given mass that are initially behind in the accelerator 420 remain within the electric field of the accelerator longer, and thus gain more kinetic energy than ions of the same mass that are initially ahead. Eventually, the ions will energy focus at a space focal plane, just as ions emitted from a single-stage ion source. In the multi-stage embodiment, ions are accelerated in each successive stage as stated above with reference to the single-stage embodiment.

In the single-stage embodiment, the space-focal length $f_4$ of the accelerator 420 is the distance from the exit grid 437 to the plane 540 (see FIG. 3). Energy focusing will occur at a distance $f_4$ slightly greater than 2d, where d is the distance separating the accelerator plate 426 from the top assembly plate 424, if $V_{accel}$ is greater than 10 $V_{source}$, where $V_{accel}$ is the voltage applied to the accelerator plate 426 and $V_{source}$ is the net voltage used to accelerate the ions out of the ion source 212. $f_4$ is intrinsically a mass-dependent quantity. But, under the voltage condition stipulated, the variation in $f_4$ will be less than 0.2 $f_4$ for ion masses in the range 1 u to m where m is the mass of the select precursor ion. In the limiting case where $V_{source}$ becomes insignificant compared to $V_{accel}$ (in practice this occurs where $V_{accel}$ is greater than 20 $V_{source}$), the energy-focusing condition for the accelerator 420 reduces to the purely geometric space-focusing condition predicted by Wiley and McLaren, viz., $f_4$=2d regardless of mass.

In the multi-stage embodiment, the space focal length of each acceleration stage is determined as stated above with reference to the single-stage embodiment. The acceleration voltage and plate spacing of any particular stage determines the position, acceleration voltage and plate spacing in the successive acceleration stage in a manner similar to that stated above with reference to the single-stage embodiment.

The embodiment illustrated in FIG. 11 includes two plate electrodes 424 and 426 that switch a relatively large voltage, e.g., about 15,000 electron volts, all at once to induce acceleration. The two-electrode construction illustrated in FIG. 11 produces ions having a nearly constant kinetic energy and a variable velocity.

The magnitude of the kinetic energy induced in the ions by the accelerator 420 correlates with the resolving power (i.e., m/Δm; also the resolution, which is Δm/m) of the instrument. Increasing the kinetic energy imparted to ions by the accelerator 420 enhances the resolution/resolving power of the instrument. This can be accomplished using the multiple-stage accelerator 420'. Depending on the relative positions and plate spacings of the acceleration stages, each stage of the multi-stage accelerator 420' could impart the same acceleration as achieved by the single-stage accelerator 420, where the voltage applied to acceleration plate 426 is about 15,000 volts. In this example, each stage of the accelerator 420' would apply a substantially equal voltage to the plate electrodes 424 and 426. Alternatively, the relative positions and plate spacings of the acceleration stages could be arranged so each stage of the illustrated accelerator 420' could be operated by applying different voltages to the plate electrodes 424 and 426. In principle, the geometric arrangement of each accelerating stage could be so arranged that some stages of the accelerator 420' could receive the same voltage to the plate electrodes 424, 426, whereas others could receive different applied voltages.

Referring back to FIG. 3, a drift region 490 is located downstream of the accelerator 420. Reflectron 500 is located downstream of the drift region 490. The reflectron 500 may be a single-stage or a dual-stage linear-field reflectron. Those of ordinary skill in the art are familiar with the construction and operation of linear-field reflectrons. The reflectron 500 has an object plane that coincides with the space focal plane 540 of the accelerator 420.

A product ion detector 510 is spatially located upstream of the reflectron 500. The detector 510 is situated so that ions will not be detected as they pass into the reflectron 500, but they will be detected after they exit the reflectron. The detector 510 may be coaxial with the ions entering the reflectron 500, in which case it will have an aperture allowing the ions to enter the reflectron, and the reflectron will direct the exiting ions to the detector. Alternatively, the detector 510 may be located away from the axis of the ions entering the reflectron 500 so that ions pass to the side of the detector as they are entering the reflectron, and are directed by the reflectron to the detector. The product ion detector 510 is any detector designed specifically for TOF applications.

An ion detector 520 is located behind the reflectron 500 so that ions reflected by the reflectron will not reach the detector 520; however, neutral products formed by metastable or induced decompositions anywhere in the space upstream of the reflectron 500 will be recorded by the detector 520. If the reflectron 500 is not operating, the detector 520 detects ions, as well as neutrals, directed to it by the ion source 212. The ion detector 520 is any detector designed specifically for TOF applications.

Operation of the Apparatus

Referring still to FIG. 3, the apparatus 210 described above includes an $MS^1$ mass spectrometer, and an $MS^2$ mass spectrometer arranged in tandem. $MS^1$ or $MS^2$ may be operated alone to produce a mass spectrum, or they may be operated in tandem to select a precursor ion and then produce a mass spectrum of the product ions of that precursor. An initial mass spectrum typically will be produced using $MS^1$ or $MS^2$. Some precursor ion appearing at a specific m/z within that spectrum will be selected for further study; $MS^1$ and $MS^2$ will then be used in tandem to conduct that study.

When $MS^1$ is operated alone as a mass spectrometer, $E_e$ and $E_a$ are adjusted so that the focal lengthy $f_1$ for space-focus equals the distance from the exit grid 218 of the ion source 212 to the plane 530 located at the ion detector 520. The velocity selector 230, the dissociation cell 410, the accelerator 420, and the reflectron 500 are all turned off. Ions produced by whatever process are initially extracted by the first electric field $E_e$ in the ion source 212 and are then accelerated by the second electric field $E_a$. The ions separate into bands, depending on their m/z, as they drift toward the detector 520. The bands are focused at the plane 530 where they are detected by the detector 520 to produce a mass spectrum.

When $MS^2$ is operated alone, $E_e$ and $E_a$ are adjusted so that the focal length $f_2$ for space-focus equals the distance from the exit grid 218 of the ion source 212 to the plane 540 located intermediate the accelerator 420 and the reflectron 500.

The plane 540 is also the object plane of the reflectron 500. The velocity selector 230, the dissociation cell 410, and the accelerator 420 are turned off. Ions produced by whatever process are initially extracted by the first electric field $E_e$ in the ion source 212 and are then accelerated by the second electric field $E_a$. The ions separate into bands, depending on their m/z, as they drift toward the plane 540. The bands of ions are focused at the plane 540, but rather than being detected at that plane, they proceed to the reflectron 500. The ions are again out of focus as they enter the reflectron 500, but the reflectron re-focuses the ions onto the detector 510, where they are detected to produce a mass spectrum.

Operating $MS^1$ alone or operating $MS^2$ alone will produce a mass spectrum of the initial sample. $MS^1$ and $MS^2$ are then operated in tandem to produce a mass spectrum of a precursor ion with a particular m/z selected from the ions of the initial sample. $E_e$ and $E_a$ are adjusted so that the focal length $f_3$ for space-focus equals the distance from the exit grid 218 of the ion source 212 to the plane 550 located at the entrance of the velocity selector 230. Ions produced by whatever process are initially extracted by the first electric field $E_e$ in the ion source 212 and are then accelerated by the second electric field $E_a$. The ions separate into bands, depending on their m/z as they drift toward the velocity selector 230.

At the plane 550, the bands of ions will not have large separations between them. However, the velocity selector 230 is able to select a precursor ion with a particular m/z, even if the spacing between m/z bands is small, because of its fast switching capability and its mode of operation. This is the case in either the dual-deflector or single-deflector mode of operation. Operation in the dual-deflector mode will be described first.

Referring now to FIGS. 7 and 8, in switching the first ion deflector from on to off, or switching the second ion deflector from off to on, a TTL trigger pulse first enters the circuitry through an entry line 314. The IC1s 320, 322 invert the TTL trigger pulse and the IC2s 328,330 convert the inverted output of IC1s back into a positive TTL pulse. The TTL pulse reaches the HVSs 332, 334, causing them to close. The R1s 324, 326 provide fine control over the propagation delay of the TTL pulse between the IC1s and the IC2s. This enables precise synchronization of the separate voltage pulses applied to the two interleaved sets of deflector strips 236.

Initially, the first deflector 232 is on and the second deflector 234 is off. Thus, initially, the first deflector 232 deflects ions from the flight path. Referring now to FIG. 12, as the select ions approach, the first deflector 232 (see FIG. 3) is switched off, and the first deflector voltage 610 drops from +V and −V to zero on adjacent strips 236. After a time $\Delta t_d$, the second deflector 234 (see FIG. 3) is switched on, and the second deflector voltage 612 rises from zero to +V and −V on adjacent strips 236.

The resolving power of either a single-deflector or dual-deflector gate is $$\frac{m}{\Delta m} \approx 2\frac{L_1 L_2}{dD_{deflector}}\frac{V_{gate}}{V_{accel}}$$

directly proportional to the magnitude of $V_{gate}$, as shown by the following equation: Theoretically, it follows that $V_{gate}$ should be as large as possible, but there are practical considerations that moderate this theoretical consideration. If $V_{gate}$ is made too high, the resulting fringe fields that extend from the entry and exit sides of a deflector will begin to degrade the transmission and resolution of the deflector and, therefore, effectively cancel the gain predicted by the above equation. Higher voltages require more complex, more costly circuitry to switch them.

Figure 13:
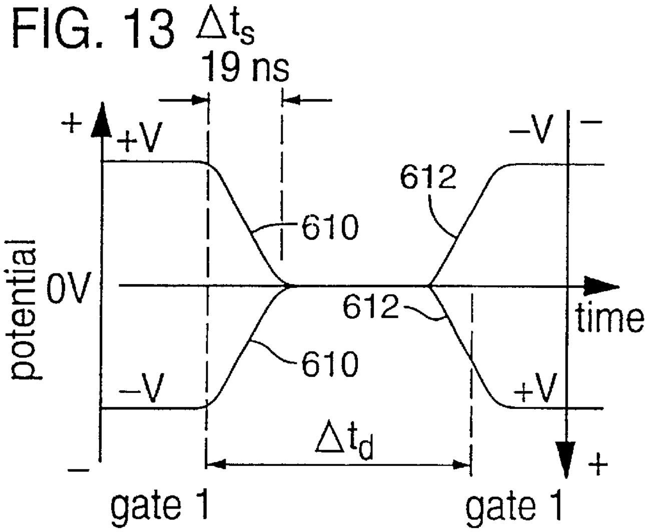
FIG. 13 is a plot of the first ion deflector voltage and the second ion deflector voltage as a function of time during operation of a velocity selector in the dual deflector mode according to the present invention.
Figures 14A, 14B, 14C:
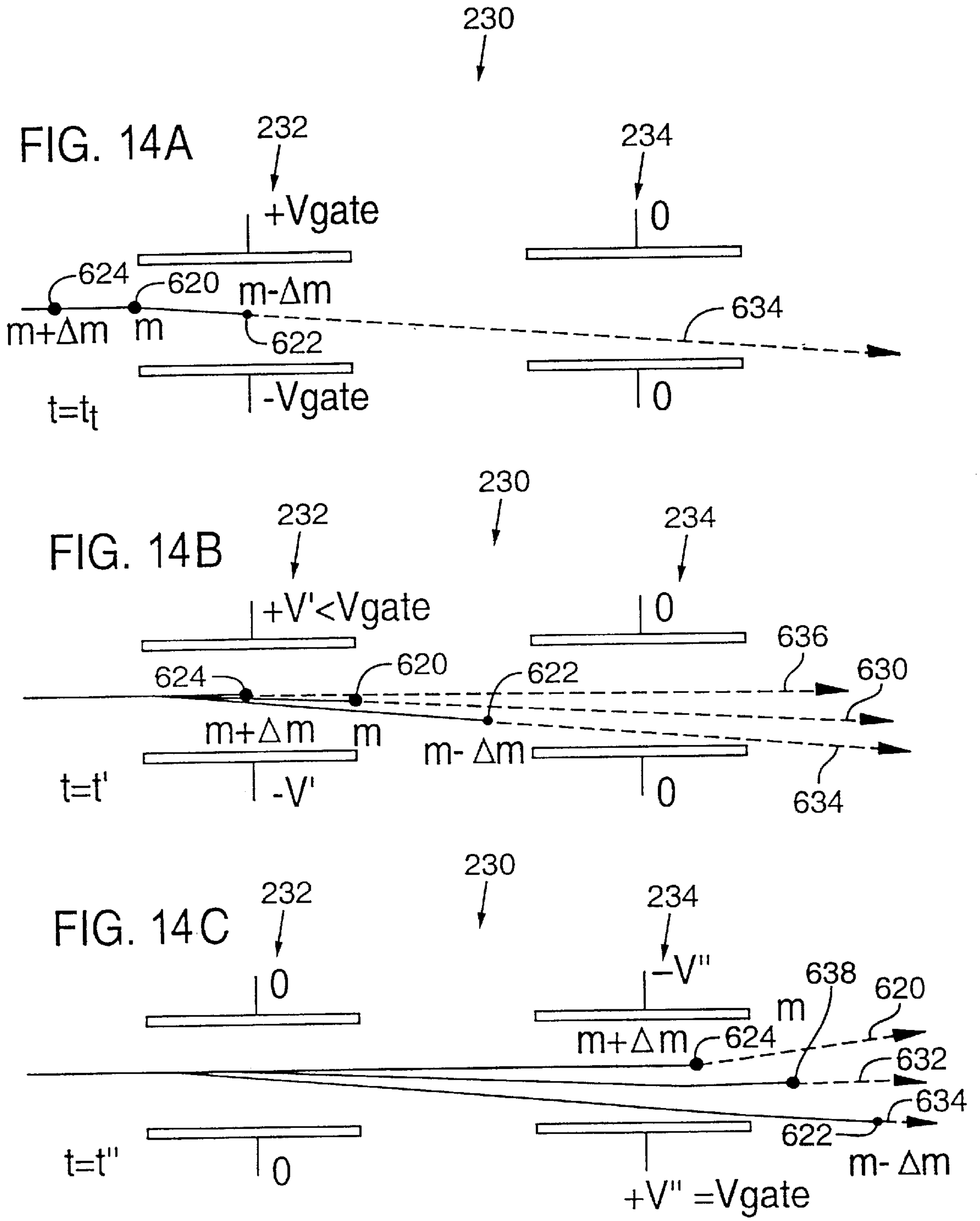
FIG. 14A is a schematic diagram showing three ions of different masses approaching the first ion deflector of a velocity selector according to the present invention.
FIG. 14B is a schematic diagram similar to FIG. 13A illustrating the three ions as the lagging ion passes through the first deflector.
FIG. 14C is a schematic diagram similar to FIG. 13B illustrating the three ions as the lagging ion passes through the second deflector.

FIGS. 14A–14C illustrate the effect on a select ion (m) 620, an ion (m−Δm) 622 having a smaller m/z than m, and an ion (m+Δm) 624 having a larger m/z than m. m 620 arrives at the first deflector 232 while the first deflector voltage 610 is dropping to zero (see FIG. 12), and is deflected onto the projected path 630 (FIG. 13B), which is toward the second deflector 234 and slightly away from its initial flight path. m 620 reaches the second deflector 234 as the second deflector voltage 612 is rising to +V and −V (see FIG. 12), and is deflected away from its previous path 630 (FIG. 13B) onto the projected path 632 (FIG. 13C), which is displaced from but parallel to the flight-axis 211 and toward the detector 510 (see FIG. 3).

m−Δm 622 arrives at the first deflector 232 before the first deflector voltage 610 has dropped significantly (see FIG. 12), and is thus deflected onto the projected path 634 (FIG. 13A). m−Δm 622 reaches the second deflector 234 before the second deflector voltage 612 rises (see FIG. 12), so it proceeds substantially along path 634 and does not reach the detector 510 (see FIG. 3). Alternatively, an ion having a m/z that is smaller than the select m/z may be deflected by the first deflector 232 such that it does not even go through the second deflector 234, or it may reach the second deflector 234 after the second deflector voltage 612 has begun to rise (see FIG. 12) and be deflected back toward the flight-axis 211, but not enough so that it reaches the detector 510. Thus, m−Δm 622 will not proceed along the flight-axis 211 beyond the velocity selector 230.

m+Δm 624 reaches the first deflector 232 after the voltage has dropped and is deflected little, if at all, by the first deflector. m+Δm 624 thus proceeds along path 636 (FIG. 13B) until it reaches the second deflector 234. m+Δm 624 reaches the second deflector 234 after the second deflector voltage 612 has risen (see FIG. 12), and is deflected by the second deflector 234 along a path 638 (FIG. 13C) away from the flight-axis 211.

By switching the voltages of the first deflector 232 and the second deflector 234, such that even the select subset of ions m 620 is deflected slightly by each gate, a very small spatial range of ions may be selected from an initial set of ions traveling toward the velocity selector 230. Selection of a small spacial range of ions corresponds to a higher resolving power (resolving power is defined as m/Δm, where m is the mass of the select ions and Δm is the range of masses selected by the velocity selector 230, i.e., the masses that reach the detector) than when a larger spatial range of ions are allowed to proceed through the velocity selector 230 without being deflected by the first deflector 232 or the second deflector 234. The net impulse from the first deflector 232 and the second deflector 234 on a mass m 620 will be zero if the first deflector voltage 610 and the second deflector voltage 612 are timed to switch in accordance with the following equation:

$$t_{1st\ deflector}(m) = t_o(m) - \frac{\Delta t_d + \Delta t_s}{2}$$

where $t_{1st\ deflector}$ (m) is the time the first deflector voltage 610 is triggered to switch off; $t_o$ (m) is the flight time of m 620 to a position exactly midway between the entrance plane to the first deflector 232 and the exit plane to the second deflector 234; $\Delta t_d$ is the difference between the time the first deflector 232 is switched off and the time the second deflector 234 is switched on (see FIG. 12); and $\Delta t_s$ is the switching time for each deflector (see FIG. 12). $t_o$ (m) may be closely estimated from the following expression:

$$t_o(m) \approx \frac{\left(D_1 + \frac{1}{2} l_{selector}\right)}{v_z(m)}$$

where $v_z$ $(m) \approx (2qV_{source}/m)^{1/2}$ is the speed of the ion through the velocity selector 230 (q is the charge of the ion, and $V_{source}$ is the total voltage used to accelerate the ion out of the source 212); $D_1$ is the distance from the exit grid 218 of the ion source 212 to the entrance plane of the first deflector 232; and $l_{selector} = l_{physical} + l_{fringe}$ is the effective length of the velocity selector 230 $l_{physical}$ is the physical length of the velocity selector, and $l_{fringe}$ is the length added to the velocity selector due to fringing electric fields, which is approximately equal to the distance x between adjacent strips 236 (see FIG. 6)]. The ions may have some net impulse and still be detected, as long as they have not received a net impulse so great as to entirely displace them from the flight path before reaching the detector 510.

Similar results may be obtained by operating the velocity selector 230 in a single deflector mode. Referring now to FIG. 14, when the deflectors 232, 234 are switched, the voltage 710 of the original positive voltage strips 236 reverses, and simultaneously the voltage 712 of the original negative voltage strips 236 reverses so that the strips that were originally negative voltage strips are then positive voltage strips. As the voltages 710, 712 are reversed, the direction of the electric field within each channel 237 also is reversed. At a point in time 714, which is halfway through the switching time, both voltages 710, 712 are at zero. At this time, the electric field within each channel 237 is zero. As a set of ions travel through the gate, the ions that are leading the select ions of mass m are deflected by the original electric field. When the select ions reach the entrance plane of the deflector, the electric field within the deflector is slightly greater than zero and the select ions are slightly deflected. When the select ions reach the position midway between the ends of the deflector, the electric field is zero (714 in FIG. 14). By the time the select ions reach the exit plane of the deflector, the direction of the electric field has reversed and its magnitude is again slightly greater than zero so the select ions are slightly deflected in a direction opposite their deflection when they entered the deflector and their final path is displaced from, but parallel to, their original path and toward the detector 510 (see FIG. 3). Ions following the select ions are deflected by the reversed electric field. The net impulse from the deflector on the selections of mass m will be zero if the deflector $$t_{deflector}(m) = t_o(m) - \frac{\Delta t_s}{2}$$

is timed to switch in accordance with the following equation:

where $t_{deflector}$ (m) is the time the deflector voltage is triggered to reverse, $t_o$ (m) is given by the equation above, and $\Delta t_s$ is the switching time for the deflector (see FIG. 14).

The ion selector operated in the single deflector mode is able to obtain similar resolving powers to the dual deflector mode, but the time window is not as conveniently expanded and contracted as it is in the dual deflector mode. However, the construction of a single deflector selector can be simplified, relative to the construction of the dual deflector selector, since the second deflector may be omitted.

The velocity selector 230 is tuned by varying the time interval between a pulse that triggers extraction from the ion source 212, and the TTL pulse that triggers the switching, i.e., $t_{1st\ deflector}$ (m) in the dual deflector mode and $t_{deflector}$ (m) is the single deflector mode, thereby changing the selected m/z. When the velocity selector is operated in single deflector mode, the selection window can be varied over a limited mass range Δm by varying the magnitude of the deflector voltage. In dual deflector mode, increasing $\Delta t_d$ from the value specified by the equation above for any given value of $t_{1st\ deflector}$ (m) increases Δm and, thus, zooms the resolving power from the maximum permitted by its geometry to ever decreasing values. Both the trigger time and the size of the selection window Δm are preferably adjusted while viewing a spectrum in real time on an oscilloscope screen or a computer monitor.

Referring back to FIG. 3, the selected subset of ions (precursor ions) then proceeds along the flight path to the dissociation cell 410 where, if necessary, a fraction of them can be induced to dissociate into smaller fragment ions. The ions then leave the dissociation cell 410 as a mixture of nondissociated precursor ions and product ions and proceed to the accelerator 420.

Initially, the voltage applied to the accelerator plate 426 in the accelerator 420 is zero. Once all the product ions are just within the accelerator 420, a high voltage (accelerator voltage) is applied to the accelerator plate 426; a positive voltage is used for positive ions and a negative voltage for negative ions. The ions are accelerated by the electric field created between the accelerator plate 426 and the top assembly plate 424. The accelerator voltage is at least ten times greater than the voltage within the ion source 212, so that more than 90% of the kinetic energy of any ion exiting the accelerator 420, regardless of mass, is due to the accelerator rather than the ion source.

The preferred accelerator voltage is as high as possible, and the preferred ion source voltage is as low as possible. The upper practical limit for the accelerator voltage is about 30 kV due, in part, to voltage breakdowns that begin to prevail at this voltage, and in part because an HVS capable of handling voltages greater than 30 kV is not available. The only commercially available HVS currently known that can switch 30 kV in 20 ns is the Behlke HTS 301. Due solely to the current availability of components, the accelerator voltages in the current working embodiment are ≦15 kV. Ion source voltages must be high enough to get good delayed-extraction focusing. For MALDI sources, a voltage of at least 1 kV is required. Thus, in the current working embodiment, ion source voltages of from about 1 kV to about 1.5 kV, and accelerator voltages of from about 10 kV to about 15 kV, are used.

The accelerator 420 provides ions in the select group with mass-dependent velocities so that they will spatially separate into m/z bands as they drift after exiting the accelerator. Moreover, because the ions in the select group are spatially separated when they enter the accelerator and the accelerator voltage is not applied until all the ions are within the accelerator 420, the accelerator focuses the ions at a space focal plane 540. Space focal plane 540 is set at a distance slightly greater than 2d from the exit of the accelerator. Rather than being detected at the plane 540, the ions proceed to the reflectron 500 as if they originated in the plane 540, i.e., plane 540 becomes the object plane for the reflectron 500. The ions are again out of focus as they enter the reflectron 500, but the reflectron re-focuses the ions onto the detector 510, where they are detected to produce a complete mass spectrum of the select precursor ion and all of its product ions without stepping the reflectron's voltage setting. MALDI mass spectra produced from a mixture of tryptic peptides by this tandem operation would, for example, allow a protein to be sequenced for the purpose of identifying either the protein or sites of modification within the protein.

Method of Using the Apparatus

The method of using the apparatus 210 to create a mass spectrum includes first preparing a sample. Methods of preparing samples are well known to those of ordinary skill in the art. Such methods vary depending on the particular type of ionization method used and the type of sample to be analyzed.

Although any of several types of ionization methods may be used with the present invention, the adjustments and timing will be described herein with reference to the apparatus described above having a two-stage MALDI source. Ion source 212 should first be set up so that the ions focused at the space focal plane 550 located at the entrance of the velocity selector 230 can be detected; this may be done either by temporarily locating a detector (not shown) at the entrance of the velocity selector 230 or by adjusting the reflectron 500 so that it has an object plane at the entrance of the velocity selector and a space focal plane at a detector 510. A reflectron 500 preferably is used so that the ions will have a greater flight distance in which to separate into mass-dependant bands and the benefit of energy focusing before being detected.

The space focal length of the two-stage ion source 212 is determined by adjusting the voltages of the first ($E_e$) and second ($E_a$) electric fields and the delay time τ between firing the laser to ionize the sample and switching on $E_e$. The voltages and the timing for ions of a specific mass m can initially be chosen by performing numerical analysis with a calculator or a computer to find the values of $E_a/E_e$ and τ such that $$t_f\left(m_l v_o + \Delta v_o, \frac{E_a}{E_e}, \tau\right) - t_f\left(m_l v_o + \Delta v_o, \frac{E_a}{E_e}, \tau\right) = 0$$

where $t_f$ $(m_l v_o + \Delta v_o, {}_{Ea}/_{Ee}, \tau)$ is an ion's total time-of-flight to the space-focal plane a distance f from the ion source as given by Wiley and McLaren, $v_o$ is the average initial velocity of the ions, and $\Delta v_o$ is the full width of the distribution of initial velocities at about half the maximum height of the distribution. For MALDI, $v_o$ is typically around 500 m/s, and $\Delta v_o$ is typically about 400 m/s. The delay time is adjusted using a digital delay generator; the clock in the digital delay generator is started by a signal indicating that ionization has begun (in the case of MALDI, a signal indicating the presence of the laser beam). Examples, without limitation, of digital delay generators suitable for use with the present invention include a Stanford Research Institute Model 535 delay generator and an EG&G Instruments/PAR Model 9650 digital delay generator. A mass spectrum is then produced by the detector and is displayed on a computer screen or an oscilloscope. While viewing this spectrum, the ratio of the voltages and/or the delay time are adjusted, and another spectrum is produced. This iterative empirical procedure continues until the most highly resolved mass spectrum possible under the given ionization conditions appears on the display, indicating that the space-focal plane for the source 212 is located at the entrance of the velocity selector 230.

Based on the mass spectrum produced by this initial procedure, or based on an analysis of a mass spectrum previously produced, a subset of ions having a select m/z ratio is selected for tandem analysis. The velocity selector 230 is adjusted to allow these select ions to pass through to a detector located downstream. In doing so, the apparatus should be set up so that the reflectron 500 has an object plane that coincides with the entrance of the velocity selector 230 and a space focal plane at a detector 510. This will automatically be the case if the reflectron was used in the initial tuning process as described in the preceding two paragraphs.

The maximum resolving power ($m/\Delta m$) possible for the velocity selector 230, whether operated in the single-deflector or dual-deflector mode, is given approximately by $$\frac{m}{\Delta m} = \frac{D_1 D_3}{x R_{eff}} \frac{V_{gate}}{V_{source}}$$

where m is the mass to be selected; $\Delta m$ is the difference between the largest and smallest masses to be selected; $D_1$ is the distance between the exit of the ion source 212 and the entry of the velocity selector 230; $D_3$ is the effective flight distance between the center of the velocity selector 230 and the detector 510; x is the distance between adjacent strips in the velocity selector; $R_{eff}$ is the effective radius of the detector 510, which is approximately equal to the sum of the radii of the detector's active area and the ion beam's projected area onto the detector-plane; $V_{gate}$ is the magnitude of the voltage applied to the strips 236 of the velocity selector 230; and $V_{source}$ is the total voltage used in the ion source 212. Thus, as $V_{gate}$ is increased, the possible resolving power also is increased. If no other factors were involved, this would be grounds for making $V_{gate}$ as large as possible. There are practical considerations, however, to take into account, which mean that $V_{gate}$ generally must be kept at moderate values. If $V_{gate}$ is made too high, the resulting fringe fields that extend from the entry and exit sides of a deflector will begin to degrade the transmission and resolution of the deflector and, thus, effectively cancel the gain predicted by the equation above. Higher voltages require more complex, more costly circuitry to switch them. In a working embodiment, it was only necessary to set $V_{gate}$ equal to 450 V to achieve a resolving power of about 5,200 for $m \approx 6{,}000$ Da and $V_{source}$=10 keV; using lower values for $V_{source}$ would require correspondingly lower values of $V_{gate}$ to achieve the same performance {see equation above}.

When setting the times for the velocity selector 230 in the single deflector mode, the time $t_{deflector}$ between triggering the extraction field $E_e$ of the ion source 212 to switch on and triggering the electric field in the velocity selector 230 to reverse itself determines the mass to be selected. In setting the initial value for $t_{deflector}$, the equation above may be used. After the initial value is set and a mass spectrum is produced, $t_{deflector}$ is adjusted, and another mass spectrum is produced. This iterative empirical process continues until the desired ions are being selected. It should be noted that the mass window $\Delta m$ for the single deflector operation can be varied over a limited range in accordance with the equation above by adjusting $V_{gate}$. Thus, a user may initially lower $V_{gate}$ so that a greater range of masses are detected. In this way, the user may more easily determine how much to increase or decrease $t_{deflector}$. Once $t_{deflector}$ is very close to the desired value (the user will know this by seeing the desired m/z at the center of the masses allowed through the gate), $V_{gate}$ may be increased to produce a greater resolving power.

If the velocity selector is operated in a dual deflector mode, the time $t_{1st\ deflector}$ between triggering the extraction field $E_e$ of the ion source 212 to switch on and triggering the electric field in the first ion deflector to switch off determines the mass m to be selected. The equation above may be used to choose the initial value for $t_{1st\ deflector}$. However, in this mode, $\Delta t_d$ can be varied to change the resolving power from the maximum allowed [see the equation above], to ever-decreasing values; increasing $\Delta t_d$ increases $\Delta m$. Thus, in adjusting the timing of the velocity selector when it is operated in the dual-deflector mode, $t_{1st\ deflector}$ will first be set using the equation above with $\Delta t_d$ set to a high value, and a mass spectrum will be produced. $t_{1st\ deflector}$ will then be adjusted so that the desired m/z ions will be toward the center of the mass range allowed through the velocity selector 230, and $\Delta t_d$ will be decreased to reduce the m/z range of ions allowed through the velocity selector. Another mass spectrum will then be produced. This empirical procedure of adjusting $t_{1st\ deflector}$ and decreasing $\Delta t_d$ continues until only ions having the desired m/z are allowed through the velocity selector 230.

Next, in preparation for turning on the accelerator 420, the voltage of the reflectron 500 is increased so that the object plane of the reflectron coincides with the space focal plane of the accelerator at plane 540, and the space focal plane of the reflectron coincides with the detector 510. The voltage of the accelerator 420 $V_{accel}$ is set so that it is at least ten times the total voltage of the ion source 212 $V_{source}$. When $V_{accel}$ is at least ten times greater than $V_{source}$, the focal length $f_4$ of the accelerator is slightly greater than 2d where d is the distance across the electric field of the accelerator (i.e., the distance between the accelerator plate 426 and the top assembly plate 424, see FIG. 11). An initial value for the delay time $t_{accelerator}$ between turning on the extraction field in the ion source 212 and turning on the $$t_{accelerator}(m) \approx \frac{D_1 + D_2}{v_{Z(m)}}$$

electric field in the accelerator 420 can be calculated from the following equation:

where $D_1$ is the distance from the exit grid 218 of the ion source 212 to the entrance plane of the velocity selector 230, $D_2$ is the distance from the entry plane of the velocity selector 230 to the accelerator plate 426 of the accelerator 420, and $v_z(m)=(2q\ V_{source}/m)^{1/2}$ is the speed of the ions when they enter the accelerator 420 (q is the charge carried by the ions and $V_{source}$ is the total voltage used to accelerate the ions out of the ion source 212). Once $t_{accelerator}$ is set, a mass spectrum is produced at the detector 510. Iterations of adjusting the delay time and producing mass spectra are performed until a setting for $t_{accelerator}$ is determined for which all the select ions are within the electric field of the accelerator 420 to produce a complete focused mass spectrum of the select ion group. During this iterative process, the voltage in the reflectron 500 also may be adjusted to move the object plane of the reflectron 500 so that it coincides more precisely with the space focal plane of the accelerator 420.

The collision cell 410 is then turned on, if necessary, to produce a mass spectrum with increased product ion signal strengths or a mass spectrum that contains a greater number of product peaks from the precursor.

All of the delay times described herein are set with a digital delay generator. Examples, without limitation, of suitable digital delay generators are the Stanford Research Institute Model 535 delay generator and the EG&G Instruments/PAR Model 9650 digital delay generator.

EXAMPLE 1

Protonated Substance-P

Analyses have been done using an apparatus including an ion source, a velocity selector downstream of the ion source, a reflectron downstream of the velocity selector, and a detector downstream of the reflectron.

A two-stage, delayed extraction MALDI source was used to produce ions. The flight distance across the extraction region (first stage) was 11.5 mm, and the flight distance across the acceleration region (second stage) was 9.5 mm.

The velocity selector included a first deflector and a second deflector downstream of the first deflector, with each deflector including 20 parallel strips as electrodes. The entry plane of the first deflector was 200 mm downstream of the exit plane of the second stage of the ion source. The distance between the centers of adjacent strips was 1.0 mm, the width of each strip (parallel to the flight direction) was 1.27 mm, the length of each strip (normal to the flight direction) was 15 mm, and the thickness of each strip (normal to the flight direction) was 0.09 mm. The distance between the centers of the strips in the first deflector and the centers of the strips in the second deflector was 10.0 mm.

The entry of the reflectron was 739 mm downstream of the entry of the first deflector in the velocity selector so that the object plane of the reflectron coincided with the velocity selector's entry plane, and the detector was 440 mm downstream of the exit of the reflectron at the reflectron's space focal plane. The reflectron was a 300 mm long, single-stage, linear-field reflectron with a voltage of 12.77 kV. This voltage, and the voltages stated in Example 2, was used solely to enable ion detection. Operation at 1 to 1.5 kV would not allow detection without subsequent acceleration as done in the working embodiment.

In using the assembly for protonated substance-P (m/z 1,348.6), where the switching time for each gate of the velocity selector was 19 ns, a resolving power of approximately 710 (corresponding to a time window of ~3.7 ns) was achieved in the single-deflector mode ($V_{source}$=10.073 kV, $V_{gate}$=250 V) and approximately 1,100 (corresponding to a time window of ~2.3 ns) was achieved in the dual-deflector mode ($V_{source}$=10.8 kV, $V_{gate}$=425 V).

EXAMPLE 2

PEG 6000

The apparatus was used as described above to analyze an oligomer of PEG 6000 at m/z of approximately 6000. The distance between the exit of the second stage of the ion source and the entry of the velocity selector was set at 900 mm, rather than 200 mm, to increase the resolving power in accordance with the equation above, and the reflectron voltage was set at 10.678 kV, rather than 12.77 kV, to improve the resolution of the reflected mass spectrum. A resolving power of approximately 5,200 (corresponding to a time window of ~4.8 ns) was achieved in the dual-deflector mode ($V_{source}$=10.04 kV, $V_{gate}$=450 V).

Several features of the construction and operation of the preferred embodiment described above are advantageous. Specifically, the width of the strips 236 in the velocity selector 230 allows them to produce an electric field that extends a significant distance along the flight path so that the impulse applied to the passing ions is sufficient to deflect them away from the detector. However, the strips 236 are thin enough so that they may be spaced across the flight path without creating a significant obstruction. Moreover, because the strips have little area they have a small capacitance, thus allowing for short switching times. Furthermore, the placement of the accelerator 420 after the collision cell 410 allows the accelerator to give the product ions mass-dependent velocities and simultaneously to focus the ions at a common space focal plane so that they can be recorded in a single mass spectrum without resorting to stepping the ion-reflector's voltage setting.

Although the invention has been described with reference to specific embodiments, it should be apparent to those of ordinary skill in the art that the arrangement and details disclosed herein may be modified without departing from the spirit and scope of the invention. Therefore, we claim all such modifications that fall within the scope and spirit of the following claims, and all equivalents thereto.

We claim:

1. A time-of-flight mass spectrometer, comprising:

an ion source; and a velocity selector that operates by complete reversal of an applied electric field as ions to be selected proceed through the selector.

2. The mass spectrometer according to claim 1 where the velocity selector comprises a first ion deflector and a second ion deflector downstream from the first ion deflector.

3. The mass spectrometer according to claim 2 where the first ion deflector includes plural electrodes defining at least one channel intermediate the electrodes, and the second ion deflector includes plural electrodes defining at least one channel intermediate the electrodes.

4. The mass spectrometer according to claim 3 where the electrodes comprise conductive strips.

5. The mass spectrometer according to claim 4 where the velocity selector defines a flight path and the strips are parallel to each other and to the flight path, the strips separating the flight path into channels at the first ion deflector and the second ion deflector.

6. The mass spectrometer according to claim 1 and further including a pulsed, linear accelerator.

7. The mass spectrometer according to claim 6 where the pulsed, linear accelerator includes plural stages of acceleration.

8. A time-of-flight mass spectrometer, comprising:

an ion source;

a velocity selector downstream of the ion source;

a dissociation cell downstream of the velocity selector;

a pulsed, linear ion accelerator downstream of the dissociation cell;

a reflectron downstream of the pulsed, linear ion accelerator; and an ion detector for detecting ions reflected by the reflectron.

9. The mass spectrometer according to claim 8 where the velocity selector comprises a first ion deflector and a second ion deflector downstream from the first ion deflector.

10. The mass spectrometer according to claim 9, wherein the first ion deflector includes plural electrodes defining at least one channel intermediate the electrodes, and the second ion deflector includes plural electrodes defining at least one channel intermediate the electrodes.

11. The mass spectrometer according to claim 8 where the electrodes comprise conductive strips.

12. The mass spectrometer according to claim 11 where the velocity selector operates by complete reversal of an applied electric field as ions to be selected proceed through the selector.

13. The mass spectrometer according to claim 11 where the velocity selector defines a flight path and the strips are parallel to each other and to the flight path, the strips separating the flight path into channels at the first ion deflector and the second ion deflector.

14. The mass spectrometer according to claim 8 where the accelerator comprises a first electrode and a second electrode downstream of the first electrode.

15. The mass spectrometer according to claim 14 where the first electrode comprises a first plate defining an aperture that is coaxial with the optical axis of the spectrometer and a second electrode comprises a second plate defining a aperture coaxial with the first aperture.

16. The mass spectrometer according to claim 8 where the accelerator comprises a first electrode and a plurality of electrodes downstream of the first electrode.

17. The mass spectrometer according to claim 16 where the first electrode comprises a first plate defining an aperture that is coaxial with the optical axis of the spectrometer and each successive electrode comprises a plate that defines an aperture coaxial with the aperture of the first plate.

18. The mass spectrometer according to claim 8 where the reflectron is selected from the group of reflectrons consisting of single-stage, linear-field reflectrons, single-stage, non-linear field reflectrons, dual-stage linear-field reflectrons and dual-stage, non-linear field reflectrons.

19. The mass spectrometer according to claim 8 where the ion source focuses ions at a space focal plane.

20. The mass spectrometer according to claim 19 where the ion source can be adjusted to move the location of the space focal plane.

21. The mass spectrometer according to claim 20 where the ion source comprises a two-stage ion source.

22. The mass spectrometer according to claim 20 where the reflectron is elected from the group of reflectrons consisting of single-stage, linear-field reflectrons, single-stage, non-linear field reflectrons, dual-stage, linear-field reflectrons and dual-stage, non-linear field reflectrons.

23. A time-of-flight mass spectrometer, comprising:

an ion source that focuses ions at a first space focal plane;

a velocity selector downstream of the ion source, the velocity selector having an entry located at the first space focal plane;

a dissociation cell downstream of the velocity selector;

an ion accelerator downstream of the dissociation cell, the accelerator including plural electrodes, each electrode initially at instrument ground potential, each of the electrodes defining an aperture, and the apertures defining a linear flight path through the accelerator, the accelerator focusing ions at a second space focal plane;

a reflectron downstream of the ion accelerator, the reflectron defining an object plane located at the second space focal plane, the reflectron focusing ions at a third space focal plane; and an ion detector located at the third space focal plane.

24. The mass spectrometer according to claim 23 where the ion source is a two-stage ion source.

25. The mass spectrometer according to claim 23 where the velocity selector comprises:

a first ion deflector including a plurality of electrically conductive strips defining a plurality of channels, the strips including alternate positive voltage strips connected to a first positive voltage source, and alternate negative voltage strips connected to a first negative voltage source; and a second ion deflector in series with the first ion deflector, the second ion deflector including a plurality of electrically conductive strips defining a plurality of channels, the strips including alternate positive voltage strips connected to a second positive voltage source, and alternate negative voltage strips connected to a second negative voltage source.

26. The mass spectrometer according to claim 23 where the detector defines an aperture for ions to pass through as the ions enter the reflectron, and the reflectron reflects the ions back toward the aperture.

27. A mass spectrometer, comprising:

an ion source;

a velocity selector downstream of the ion source, the velocity selector comprising a first ion deflector including a plurality of electrically conductive strips defining a plurality of channels, the strips including alternate positive voltage strips connected to a first positive voltage source, and alternate negative voltage strips connected to a first negative voltage source, and a second ion deflector in series with the first ion deflector, the second ion deflector including a plurality of electrically conductive strips defining a plurality of channels, the strips including alternate positive voltage strips connected to a second positive voltage source, and alternate negative voltage strips connected to a second negative voltage source;

a dissociation cell downstream of the velocity selector;

a reflectron downstream of the dissociation cell; and a first ion detector positioned to detect ions reflected by the reflectron.

28. The mass spectrometer according to claim 27 where the ion source focuses ions at a first space focal plane.

29. The mass spectrometer according to claim 28 where the first space focal plane is located at the first ion deflector of the velocity selector.

30. The mass spectrometer according to claim 28 further including a second detector positioned to detect ions and neutral molecules not reflected by the reflectron, the first space focal plane being located at the second detector.

31. The mass spectrometer according to claim 28 where the reflectron defines an object plane, and the first space focal plane is located at the object plane.

32. The mass spectrometer according to claim 27 further including an ion accelerator downstream of the dissociation cell and upstream of the reflectron, the accelerator comprising plural electrodes, each electrode defining an aperture.

33. The mass spectrometer according to claim 32 where the accelerator focuses ions at a second space focal plane.

34. The mass spectrometer according to claim 33 where the reflectron defines an object plane and the second space focal plane is located at the object plane.

35. A mass spectrometer, comprising:

an ion source for focusing ions at a first space focal plane;

a velocity selector downstream of the ion source, the velocity selector having an entry located at the first space focal plane, the velocity selector including a first ion deflector including a plurality of electrically conductive strips defining a plurality of channels, the strips including alternate positive voltage strips connected to a first positive voltage source, and alternate negative voltage strips connected to a first negative voltage source, and a second ion deflector in series with the first ion deflector, the second ion deflector including a plurality of electrically conductive strips defining a plurality of channels, the strips including alternate positive voltage strips connected to a second positive voltage source, and alternate negative voltage strips connected to a second negative voltage source;

a dissociation cell downstream of the velocity selector;

an ion accelerator downstream of the dissociation cell, the accelerator including plural electrodes, each electrode initially at instrument ground potential, each of the electrodes defining a aperture, and the apertures defining a flight path through the accelerator, the accelerator focusing ions at a second space focal plane;

a reflectron downstream of the ion accelerator, the reflectron defining an object plane located at the second space focal plane, the reflectron focusing ions at a third space focal plane; and an ion detector located at the third space focal plane.

36. The method according to claim 35 where the deflecting step comprises:

applying a voltage across a first ion deflector until the subset of ions approaches the first ion deflector to deflect ions from the set of ions that are ahead of the subset of ions away from the flight path;

decreasing the voltage across the first ion deflector to allow the subset of ions through the first ion deflector; and increasing the voltage across a second ion deflector, located downstream of the first ion deflector, so as to allow the subset of ions to proceed along the flight path, but to deflect ions of the set of ions that are behind the subset of ions.

37. An ion selector, comprising:

a first ion deflector including a plurality of electrically conductive first strips defining a plurality of first channels, the first strips including alternate positive voltage first strips connected to a first positive voltage source, and alternate negative voltage first strips connected to a first negative voltage source; and a second ion deflector in series with the first ion deflector, the second ion deflector including a plurality of electrically conductive second strips defining a plurality of second channels, the second strips including alternate positive voltage second strips connected to a second positive voltage source, and alternate negative voltage second strips connected to a second negative voltage source.

38. A method for producing a mass spectrum, comprising:

ionizing a material to produce a set of ions that is confined to a sufficiently small volume of space and to a sufficiently short interval of time to allow subsequent space focusing of the set of ions;

accelerating the set of ions so that each ion's velocity within the set of ions depends on the mass of the ion;

allowing the set of ions to drift along a flight path of a time-of-flight mass analyzer so that ions within the set of ions having different velocities spatially separate along the flight path;

deflecting all but a select subset of the ions from the flight path, the subset of ions having a select velocity range;

inducing dissociation of a portion of the subset of ions;

accelerating the subset of ions linearly along the flight path so that the velocity of each ion within the subset of ions depends on the mass of the ion;

allowing the subset of ions to drift along the flight path so that ions of different velocities spatially separate along the flight path; and detecting the subset of ions at a location along the flight path.

39. The method according to claim 38 where the interval of time is less than about 10 nanoseconds.

40. The method according to claim 38 where the interval of time is from about 1 nanosecond to about 10 nanoseconds.

41. The method according to claim 38 where the volume of space is from about 10 $\mu$m to about 200 $\mu$m in diameter and from about 1 nm to about 10 nm in length.

42. The method according to claim 38 where accelerating a set of ions comprises producing and extracting the set of ions from the material, passing the set of ions through a first electric field, and passing the set of ions through a second electric field.

43. The method according to claim 42 where the second electric field is less than, equal to or greater than the first electric field.

44. The method according to claim 43 where the first electric field remains off until substantially all of the set of ions are within the first electric field region, and the first electric field is then switched on.

45. The method according to claim 38 where accelerating the subset of ions comprises passing the subset of ions through an electric field.

46. The method according to claim 45 where the electric field remains off until substantially all of the subset of ions are within the electric field region and the electric field is then switched on.

47. The method according to claim 38 where the subset of ions has an initial velocity direction before accelerating the subset of ions, and accelerating the subset of ions comprises accelerating the subset of ions in a direction that is substantially the same as the initial velocity direction.

48. The method according to claim 38 further comprising focusing the set of ions at a first space focal plane before deflecting a select subset of icons.

49. The method according to claim 48 where deflecting includes deflecting ions at the first space focal plane.

50. The method according to claim 38 further comprising focusing the set of ions at a second space focal plane before detecting the subset of ions.

51. The method according to claim 50 where detecting comprises detecting the sub set of ions at the second space focal plane.

52. The method according to claim 51 where the first electric field is off until substantially all of the set of ions are within the first electric field region, and the first electric field is then switched on.

53. A method for producing a mass spectrum, comprising:

ionizing a material to produce a set of ions that is confined to a sufficiently small volume of space and to a sufficiently short internal of time to allow for subsequent space focusing of the set of ions;

accelerating the set of ions such that the velocity of each ion within the set of ions depends on the mass of the ion;

allowing the set of ions to move along a flight path of a time-of-flight mass analyzer so that ions of different velocities spatially separate along the flight path;

applying a voltage across a first ion deflector positioned along the flight path to deflect ions passing through the first ion deflector in a first direction away from the flight path;

switching off the voltage applied to the first ion deflector in phase with passage of a subset of ions having a select range of velocities so that the subset of ions is deflected less in the first direction than preceding ions;

switching on a voltage applied to a second ion deflector, arranged downstream of the first ion deflector, in phase with passage of the subset of ions to deflect ions passing through the second ion deflector in a second direction to deflect the subset of ions back along the flight path, and to deflect ions following the subset of ions away from the flight path;

maintaining the voltage applied to the second ion deflector to deflect ions following the subset of ions away from the flight path;

inducing dissociation of a portion of the subset of ions;

accelerating the subset of ions, such that each ion's velocity within the subset of ions depends on the mass of the ion;

focusing the subset of ions at a space focal plane; and
detecting ions at the space focal plane.

54. The method according to claim 53 where accelerating the set of ions comprises producing and extracting the set of ions from the material and passing the set of ions through a first electric field, and passing the ions through a second electric field.

55. The method according to claim 54 where the second electric field is less than, equal to or greater than the first electric field.

56. The method according to claim 53 where accelerating the subset of ions comprises passing the subset of ions through an electric field, the electric field remaining off until substantially all of the subset of ions are within the electric field and the electric field is then switched on.

57. The method according to claim 56 where the subset of ions has an initial velocity direction before accelerating the subset of ions, and accelerating the subset of ions comprises accelerating the subset of ions in a direction substantially the same as the initial velocity direction.

58. The method according to claim 53 further comprising focusing the set of ions at a first space focal plane before deflecting ions.

59. The method according to claim 58 where deflecting includes deflecting ions at the first space focal plane.

60. The method according to claim 53 further comprising focusing the set of ions at a second space focal plane before detecting ions.

61. The method according to claim 60 where detecting ions comprises detecting the subset of ions at the second space focal plane.

62. The method according to claim 61 where the first space focal plane is at the first ion deflector.

63. A method for selecting a subset of ions from a set of ions, comprising:

applying a voltage across a first ion deflector positioned along a flight path of a time-of-flight mass analyzer so as to deflect ions passing through the first ion deflector in a first direction away from the flight path;

switching off the voltage applied to the first ion deflector in phase with the passage of a subset of ions having a select range of velocities so that the subset of ions is deflected less in the first direction than preceding ions;

switching on a voltage applied to a second ion deflector arranged downstream of the first ion deflector in phase with passage of the subset of ions to deflect ions passing through the second ion deflector in a second direction and to deflect the subset of ions back along the flight path; and maintaining a voltage across the second ion deflector to deflect ions following the subset of ions away from the flight path.

64. A method for selecting a subset of ions from a set of ions, comprising:

accelerating a set of ions such that the ions have varying velocities;

allowing the set of ions to move along a flight path of a time-of-flight mass analyzer so that ions of different velocities spatially separate along the flight path;

applying a voltage across a first ion deflector positioned along the flight path so as to deflect ions passing through the first ion deflector in a first direction away from the flight path;

switching off the voltage across the first ion deflector in phase with passage of a subset of ions having a select range of velocities so that the subset of ions is deflected less in the first direction than preceding ions;

switching on the voltage across a second ion deflector arranged downstream of the first ion deflector in phase with the passage of the subset of ions to deflect ions passing through the second ion deflector in a second direction and to deflect the subset of ions back along the flight path; and maintaining a voltage across the second ion deflector to deflect ions following the subset of ions away from the flight path.

65. The method according to claim 64 where accelerating a set of ions comprises passing the set of ions through a first electric field, and passing the set of ions through at least a second electric field.

66. The method according to claim 65 where the second electric field is less than, equal to or greater than the first electric field.

67. The method according to claim 65 where the first electric field remains off until substantially all of the set of ions are within the first electric field region, and the first electric field is then switched on.

68. The method according to claim 64 further comprising focusing the set of ions at a first space focal plane before applying a voltage.

69. A method for producing a mass spectrum, comprising:

ionizing a material to produce a pulsed or continuous beam of ions that has a velocity in a first direction and a width in a second direction orthogonal to the first direction;

injecting the beam of ions in the first direction into an extraction region of a two-stage ion extraction source;

accelerating a set of ions that is confined to a short interval of time out of the beam in the second direction orthogonal to the first direction so that each ion's velocity within the set of ions depends on the mass of the ion;

allowing the set of ions to drift along a flight path of a time-of-flight mass analyzer so that ions within the set of ions having different velocities spatially separate along the flight path;

deflecting all of the set of ions, except a select subset of the ions, from the flight path, the select subset of ions having a select velocity range;

inducing dissociation of a portion of the subset of ions;

accelerating the subset of ions linearly along the flight path so that each ion's velocity within the subset of ions depends on the mass of the ion;

allowing the subset of ions to drift along the flight path so that ions having different velocities spatially separate along the flight path; and detecting the subset of ions at a location along the flight path.

70. The method according to claim 69 where accelerating the select set of ions comprises producing and extracting the beam of ions from the material, passing the select set of ions through a first electric field, and passing the select set of ions through a second electric field in the second direction.

71. The method according to claim 70 where the second electric field is less than, equal to or greater than the first electric field.

72. The method according to claim 70 where the first electric field remains off as the beam of ions enter the first electric field region, and the first electric field is then switched on.

73. The method according to claim 70 where the subset of ions has an initial velocity direction before the step of accelerating the subset of ions, and accelerating the subset of ions comprises accelerating the subset of ions in substantially the initial velocity direction.

74. The method according to claim 70 further comprising focusing the set of ions at a first space focal plane before deflecting ions at the first space focal plane.

75. The method according to claim 70 further comprising focusing the set of ions at a second space focal plane before detecting ions.

76. The method according to claim 69 where deflecting comprises:

applying a voltage across a first ion deflector until the subset of ions approaches the first ion deflector to deflect ions from the set of ions that are ahead of the subset of ions away from the flight path;

decreasing the voltage across the first ion deflector to allow the subset of ions through the first ion deflector; and increasing the voltage across a second ion deflector, located downstream of the first ion deflector, to allow the subset of ions to proceed along the flight path, but to deflect ions of the set of ions that are behind the subset of ions.

77. The method according to claim 69 where accelerating the subset of ions comprises passing the subset of ions through an electric field, the electric field remaining off until substantially all of the subset of ions are within the electric field region, and the electric field is then switched on.

78. The method according to claim 77 where accelerating the subset of ions comprises accelerating the subset of ions through successive electric fields, each successive electric filed remaining off until substantially all of the subset of ions emerging from the preceding electric field region are within the successive electric field region and then the successive electric field is switched on.

79. A method for producing a mass spectrum, comprising:

ionizing a material to produce a pulsed or continuous beam of ions that has a velocity in a first direction and a width in a second direction orthogonal to the first direction;

injecting the beam of ions in the first direction into an extraction region of a two-stage ion extraction source;

accelerating a select set of ions that is confined to a short interval of time out of the beam in the second direction orthogonal to the first direction such that each ion's velocity within the set of ions depends on the mass of the ion;

allowing the set of ions to move along a flight path of a time-of-flight mass analyzer so that ions of different velocities spatially separate along the flight path;

applying a voltage across a first ion deflector positioned along the flight path to deflect ions passing through the first ion deflector in a first direction away from the flight path;

switching off the voltage applied to the first ion deflector in phase with the passage of a subset of ions having a select range of velocities so that the subset of ions is deflected less in the first direction than preceding ions;

switching on a voltage applied to a second ion deflector arranged downstream the first ion deflector in phase with passage of the subset of ions so as to deflect ions passing through the second ion deflector in a second direction to deflect the subset of ions back along the flight path, and to deflect ions following the subset of ions away from the flight path;

maintaining the voltage applied to the second ion deflector so as to deflect ions following the subset of ions away from the flight path;

inducing dissociation of a portion of the subset of ions;

accelerating the subset of ions, such that the each ion's velocity within the subset of ions depends on the mass of the ion;

focusing the subset of ions at a space focal plane; and detecting ions at the space focal plane.

80. The method according to claim 79 where accelerating a select set of ions comprises:

producing and extracting the beam of ions from the material injecting the beam of ions in the first direction into an extraction region of a two-stage ion extraction source; and passing the select set of ions through a first electric field in the second direction orthogonal to the first direction, and passing the ions through a second electric field in the second direction.

81. The method of claim 80 where the second electric field is less than, equal to or greater than the first electric field.

82. The method according to claim 80 where the first electric field remains off as the beam ions enter the first electric field region, and the first electric field is then switched on.

83. The method according to claim 79 where accelerating the subset of ions comprises passing the subset of ions through an electric field, the electric field remaining off until substantially all of the subset of ions are within the electric field region and the electric field is then switched on.

84. The method according to claim 83 where the subset of ions has an initial velocity direction before accelerating the subset of ions, and accelerating the subset of ions comprises accelerating the subset of ions in a direction that is substantially the same as the initial velocity direction.

85. The method according to claim 79 where accelerating the subset of ions comprises accelerating the subset of ions through successive electric fields, each successive electric field remaining off until substantially all of the subset of ions emerging from the preceding electric field region are within the successive electric field region and then the successive electric field is switched on.

86. The method according to claim 85 where applying a voltage includes deflecting ions at the first space focal plane.

87. The method according to claim 86 where detecting comprises detecting the subset of ions at the second space focal plane.

88. The method according to claim 79 further comprising the step of focusing the set of ions at a first space focal plane before applying a voltage.

89. The method according to claim 79 further comprising focusing the set of ions at a second space focal plane before the detecting step.

* * * * *